(12) United States Patent
Vian et al.

(10) Patent No.: US 8,812,154 B2
(45) Date of Patent: Aug. 19, 2014

(54) AUTONOMOUS INSPECTION AND MAINTENANCE

(75) Inventors: John Lyle Vian, Renton, WA (US); Emad William Saad, Renton, WA (US); Gregory J. Clark, Seattle, WA (US); Robert Daniel Kalinowski, Saint Charles, MO (US)

(73) Assignee: The Boeing Company, Chicago, IL (US)

(*) Notice: Subject to any disclaimer, the term of this patent is extended or adjusted under 35 U.S.C. 154(b) by 693 days.

(21) Appl. No.: 12/404,493

(22) Filed: Mar. 16, 2009

(65) Prior Publication Data

US 2010/0235037 A1 Sep. 16, 2010

(51) Int. Cl.
*G06F 19/00* (2011.01)

(52) U.S. Cl.
USPC ............................ 700/245; 700/248; 700/258

(58) Field of Classification Search
CPC ........... G05B 2219/39102; G05B 2219/40613; B25J 9/1697
USPC ............. 700/245, 248, 258; 901/8, 44, 46, 47
See application file for complete search history.

(56) References Cited

U.S. PATENT DOCUMENTS

| | | |
|---|---|---|
| 2,849,701 A | 8/1958 | Clark |
| 4,463,428 A | 7/1984 | Gilliam |
| 4,827,416 A | 5/1989 | Kawagoe et al. |
| 4,918,321 A | 4/1990 | Klenk et al. |
| 5,014,042 A | 5/1991 | Michoud et al. |
| 5,036,935 A | 8/1991 | Kohara |
| 5,203,646 A * | 4/1993 | Landsberger et al. ........ 405/191 |
| 5,220,263 A | 6/1993 | Onishi et al. |
| 5,237,404 A * | 8/1993 | Tanaka et al. ................. 348/128 |
| 5,318,254 A * | 6/1994 | Shaw et al. ............... 244/134 C |
| 5,324,948 A | 6/1994 | Dudar et al. |
| 5,334,982 A | 8/1994 | Owen |
| 5,340,056 A * | 8/1994 | Guelman et al. ............. 244/3.16 |

(Continued)

FOREIGN PATENT DOCUMENTS

| | | |
|---|---|---|
| EP | 0512866 A1 | 11/1992 |
| EP | 1193168 A2 | 4/2002 |

(Continued)

OTHER PUBLICATIONS

Gunatilake et al., "Image Understanding Algorithms for Remote Visual Inspection of Aircraft Surfaces", Proceedings of the SPIE conference on Machine Vision Applications in Industrial Inspection V, Copyright 1997, 12 pages.*

(Continued)

*Primary Examiner* — Khoi Tran
*Assistant Examiner* — Jorge Peche
(74) *Attorney, Agent, or Firm* — Yee & Associates, P.C.

(57) ABSTRACT

The different advantageous embodiments may provide an apparatus that may comprise a number of mobile robotic machines, a wireless communications system and a computer system. The number of mobile robotic machines may be capable of moving to a number of locations in a maintenance area and may be capable of performing a number of maintenance operations on a structure in the maintenance area. The wireless communications system may be capable of providing communication with the number of mobile robotic machines within the maintenance area. The computer system may be capable of exchanging information with the number of mobile robotic machines using the wireless communications system.

22 Claims, 16 Drawing Sheets

(56) References Cited

U.S. PATENT DOCUMENTS

| | | | |
|---|---|---|---|
| 5,351,621 A * | 10/1994 | Tanaka et al. | 104/94 |
| 5,416,476 A | 5/1995 | Rendon | |
| 5,487,440 A * | 1/1996 | Seemann | 180/164 |
| 5,490,646 A * | 2/1996 | Shaw et al. | 244/134 C |
| 5,586,028 A | 12/1996 | Sekine et al. | |
| 5,633,707 A * | 5/1997 | Seemann | 356/35.5 |
| 5,695,155 A | 12/1997 | Macdonald et al. | |
| 5,726,705 A | 3/1998 | Imanishi et al. | |
| 5,831,570 A | 11/1998 | Ammar et al. | |
| 5,832,187 A | 11/1998 | Pedersen et al. | |
| 5,845,002 A | 12/1998 | Heck et al. | |
| 5,845,725 A | 12/1998 | Kawada | |
| 5,982,278 A | 11/1999 | Cuvelier | |
| 5,995,884 A | 11/1999 | Allen et al. | |
| 6,236,735 B1 | 5/2001 | Bjorner et al. | |
| 6,266,138 B1 | 7/2001 | Keshavmurthy | |
| 6,293,141 B1 | 9/2001 | Nance | |
| 6,364,026 B1 | 4/2002 | Doshay | |
| 6,476,712 B1 | 11/2002 | Achterholt | |
| 6,565,361 B2 | 5/2003 | Jones et al. | |
| 6,606,563 B2 | 8/2003 | Corcoran, III | |
| 6,671,588 B2 | 12/2003 | Otake et al. | |
| 6,819,265 B2 | 11/2004 | Jamieson et al. | |
| 6,825,758 B1 | 11/2004 | Laitsaari | |
| 6,888,446 B2 | 5/2005 | Nantz et al. | |
| 6,904,335 B2 | 6/2005 | Solomon | |
| 6,907,799 B2 | 6/2005 | Jacobsen et al. | |
| 6,947,797 B2 | 9/2005 | Dean et al. | |
| 6,953,094 B2 * | 10/2005 | Ross et al. | 166/381 |
| 6,984,952 B2 | 1/2006 | Peless et al. | |
| 7,076,335 B2 * | 7/2006 | Seemann | 700/248 |
| 7,212,106 B2 | 5/2007 | Katou | |
| 7,218,993 B2 | 5/2007 | Yasukawa et al. | |
| 7,236,861 B2 | 6/2007 | Paradis et al. | |
| 7,239,990 B2 | 7/2007 | Struijs | |
| 7,250,849 B2 | 7/2007 | Spriggs et al. | |
| 7,280,890 B2 | 10/2007 | Seemann | |
| 7,303,010 B2 | 12/2007 | de Guzman et al. | |
| 7,327,112 B1 * | 2/2008 | Hlynka et al. | 318/568.12 |
| 7,337,156 B2 | 2/2008 | Wippich | |
| 7,414,523 B2 | 8/2008 | Li et al. | |
| 7,417,738 B2 | 8/2008 | Taylor et al. | |
| 7,499,772 B2 * | 3/2009 | Wilcox et al. | 701/3 |
| 7,501,616 B2 | 3/2009 | Wiklof | |
| 7,586,422 B2 | 9/2009 | Goodman et al. | |
| 7,626,513 B2 | 12/2009 | Goodman et al. | |
| 7,627,447 B2 | 12/2009 | Marsh et al. | |
| 7,714,702 B2 | 5/2010 | Khuzadi | |
| 7,765,038 B2 | 7/2010 | Appleby et al. | |
| 7,765,668 B2 | 8/2010 | Townsend et al. | |
| 7,796,018 B2 | 9/2010 | Khuzadi | |
| 7,797,095 B2 | 9/2010 | Rado | |
| 7,813,888 B2 | 10/2010 | Vian et al. | |
| 7,817,026 B2 | 10/2010 | Watabe et al. | |
| 7,832,281 B2 | 11/2010 | Mian et al. | |
| 7,844,364 B2 | 11/2010 | McLurkin et al. | |
| 7,860,618 B2 | 12/2010 | Brandstetter et al. | |
| 7,894,948 B2 | 2/2011 | Stroud | |
| 7,896,113 B1 * | 3/2011 | Ramirez | 180/9 |
| 7,941,261 B2 | 5/2011 | Johnsen | |
| 8,051,547 B2 | 11/2011 | Toh et al. | |
| 8,060,270 B2 | 11/2011 | Vian et al. | |
| 8,078,319 B2 | 12/2011 | Franke et al. | |
| 8,140,250 B2 | 3/2012 | Mian et al. | |
| 8,145,367 B2 | 3/2012 | Khatwa et al. | |
| 8,150,105 B2 | 4/2012 | Mian et al. | |
| 8,181,532 B2 | 5/2012 | Schmidt et al. | |
| 8,260,485 B1 | 9/2012 | Meuth et al. | |
| 8,504,505 B2 | 8/2013 | Mintah | |
| 2002/0060267 A1 * | 5/2002 | Yavnai | 244/23 A |
| 2002/0073788 A1 * | 6/2002 | Hatley et al. | 73/866.5 |
| 2003/0048081 A1 * | 3/2003 | Seemann | 318/68 |
| 2003/0089183 A1 * | 5/2003 | Jacobsen et al. | 73/865.8 |
| 2003/0135327 A1 | 7/2003 | Levine et al. | |
| 2003/0169335 A1 | 9/2003 | Monore | |
| 2004/0030571 A1 | 2/2004 | Solomon | |
| 2004/0054507 A1 | 3/2004 | Mott | |
| 2004/0055746 A1 * | 3/2004 | Ross et al. | 166/250.15 |
| 2004/0073324 A1 | 4/2004 | Pierro et al. | |
| 2004/0073411 A1 | 4/2004 | Alston et al. | |
| 2004/0158358 A1 | 8/2004 | Anezaki et al. | |
| 2005/0033517 A1 | 2/2005 | Kondoh et al. | |
| 2005/0073585 A1 | 4/2005 | Ettinger et al. | |
| 2005/0073673 A1 * | 4/2005 | Devitt et al. | 356/37 |
| 2005/0113943 A1 | 5/2005 | Nian | |
| 2005/0113975 A1 * | 5/2005 | Seemann | 700/245 |
| 2005/0119789 A1 * | 6/2005 | Seemann | 700/245 |
| 2005/0126794 A1 | 6/2005 | Palmer et al. | |
| 2005/0217589 A1 | 10/2005 | Daniel et al. | |
| 2006/0085106 A1 | 4/2006 | Gaudiano et al. | |
| 2006/0114531 A1 | 6/2006 | Webb et al. | |
| 2006/0184291 A1 * | 8/2006 | Paradis et al. | 701/23 |
| 2006/0198952 A1 * | 9/2006 | Nagase et al. | 427/154 |
| 2006/0271251 A1 | 11/2006 | Hopkins | |
| 2007/0062299 A1 | 3/2007 | Mian et al. | |
| 2007/0081154 A1 | 4/2007 | Mapoles et al. | |
| 2007/0129847 A1 | 6/2007 | Ulmer et al. | |
| 2007/0146728 A1 | 6/2007 | Pristner | |
| 2007/0208442 A1 | 9/2007 | Perrone | |
| 2008/0004749 A1 * | 1/2008 | Hostettler | 700/245 |
| 2008/0021604 A1 | 1/2008 | Bouvier et al. | |
| 2008/0140318 A1 | 6/2008 | Breed | |
| 2008/0148876 A1 * | 6/2008 | Hock et al. | 73/865.8 |
| 2008/0154458 A1 | 6/2008 | Brandstetter et al. | |
| 2008/155807 A1 * | 7/2008 | Toh et al. | 29/525.01 |
| 2008/0252489 A1 | 10/2008 | Naimer et al. | |
| 2008/0270866 A1 | 10/2008 | Choi et al. | |
| 2008/0297333 A1 | 12/2008 | Khuzadi | |
| 2008/0297375 A1 | 12/2008 | Khuzadi | |
| 2009/0079839 A1 | 3/2009 | Fischer et al. | |
| 2009/0219393 A1 | 9/2009 | Vian et al. | |
| 2009/0243828 A1 | 10/2009 | Hering et al. | |
| 2009/0285491 A1 | 11/2009 | Ravenscroft et al. | |
| 2010/0017052 A1 | 1/2010 | Luce | |
| 2010/0023201 A1 | 1/2010 | Kinney et al. | |
| 2010/0039294 A1 | 2/2010 | Feyereisen et al. | |
| 2010/0063650 A1 | 3/2010 | Vian et al. | |
| 2010/0094487 A1 | 4/2010 | Brinkman | |
| 2010/0211358 A1 | 8/2010 | Kesler et al. | |
| 2010/0250022 A1 | 9/2010 | Hines et al. | |
| 2010/0271191 A1 | 10/2010 | de Graff et al. | |
| 2010/0312387 A1 | 12/2010 | Jang et al. | |
| 2010/0312388 A1 | 12/2010 | Jang et al. | |
| 2011/0313614 A1 | 12/2011 | Hinnant, Jr. et al. | |
| 2012/0038492 A1 | 2/2012 | Maggiore et al. | |
| 2012/0041639 A1 | 2/2012 | Followell et al. | |
| 2012/0081540 A1 | 4/2012 | Jang | |
| 2012/0130701 A1 * | 5/2012 | Khella | 703/13 |
| 2013/0261876 A1 | 10/2013 | Froom et al. | |

FOREIGN PATENT DOCUMENTS

| | | | |
|---|---|---|---|
| EP | 1619625 | 1/2006 | |
| EP | 1884453 A2 | 2/2008 | |
| EP | 2208971 | 7/2010 | |
| EP | 2259245 | 12/2010 | |
| FR | 2930669 A1 | 10/2009 | |
| GB | 2308656 | 7/1997 | |
| GB | 2429819 | 3/2007 | |
| GB | 2455804 A * | 6/2009 | B25J 9/06 |
| JP | 2007183172 | 7/2007 | |
| WO | WO2004081488 | 9/2004 | |
| WO | WO2005113261 | 12/2005 | |
| WO | WO2006053433 | 5/2006 | |
| WO | WO2007080584 | 7/2007 | |
| WO | 2008127468 A2 | 10/2008 | |
| WO | 2009142933 A2 | 11/2009 | |
| WO | WO2010141180 | 12/2010 | |
| WO | WO2011119634 | 9/2011 | |

(56) References Cited

FOREIGN PATENT DOCUMENTS

| WO | WO2012021177 | 2/2012 |
|---|---|---|
| WO | WO2012021179 | 2/2012 |
| WO | WO2012047479 | 4/2012 |

OTHER PUBLICATIONS

PCT Search Report regarding Application PCT/US2011/029466, filed Mar. 22, 2011, Issued by International Searching Authority.
International Search Report for Application No. PCT/US2010/033917 dated Nov. 26, 2010.
U.S. Appl. No. 12/372,616, filed Feb. 17, 2009, Kesler et al.
U.S. Appl. No. 11/857,217, filed Sep. 18, 2007, Vian et al.
U.S. Appl. No. 12/124,511, filed May 21, 2008, Vian et al.
U.S. Appl. No. 12/205,658, filed Sep. 5, 2008, Vian et al.
U.S. Appl. No. 12/124,565, filed May 21, 2008, Vian et al.
U.S. Appl. No. 12/479,667, filed Jun. 5, 2009, Jang et al.
U.S. Appl. No. 12/560,569, filed Feb. 5, 2010, Jang et al.
U.S. Appl. No. 12/701,033, filed Feb. 5, 2010, Kesler et al.
GB Combined Search and Examination Report for application P49034GB/AER dated Jun. 10, 2010.
Office Action, dated May 23, 2013, regarding U.S. Appl. No. 12/70,594, 28 pages.
Final Office Action, dated Mar. 7, 2013, regarding U.S. Appl. No. 12/854,646, 22 pages.
Office Action, dated Mar. 28, 2013, regarding U.S. Appl. No. 12/854,671, 37 pages.
"In-Sight Line Scan Vision System", Cognex, Webinar, retrieved Feb. 5, 2010, 17 pages.
Ollero, "Mutliple Heterogenous Unmanned Aerial Vehicles", Springer Tracts in Advanced Robotics, vol. 37, Copyright 2007, 233 pages (Abstract).
"Unmanned Aerial Vehicle (UAV) ZALA 421-04M chosen for Aerial Monitoring of Forest Fires", published by news.wood.ru, Feb. 2010, 3 pages.
Frost "A Practical Guide to Using the In-Sight 5604 Line Scan Vision System", In-Sight Vision Systems, Cognex, Mar. 2009, 20 pages.
DeVault, "Robotic system for underwater inspection of bridge piers", IEEE Instrumentation & Measurement Magazine, vol. 3, Iss.3, Sep. 2000, pp. 32-37 (Abstract).
GB Search Report and Examination Report dated Jun. 14, 2011 regarding application GB1100763.0, applicant's reference P51280GB/AER/LJW, applicant The Boeing Company, 9 pages.
PCT Search Report and Written Opinion dated Jun. 8, 2011 regarding international application PCT/US2011/029766, applicant's reference 10-0173PCT, applicant The Boeing Company, 9 pages.
PCT Search Report dated Feb. 16, 2012 regarding international application PCT/US2011/030150, applicant's reference 10-0174PCT, applicant The Boeing Company, 6 pages.
PCT Search Report dated Feb. 7, 2012 regarding international application PCT/US2011/051830, applicant's reference 10-0602PCT, applicant The Boeing Company, 4 pages.
USPTO Office Action dated Oct. 4, 2011 regarding U.S. Appl. No. 12/701,033, 24 pages.
USPTO Final Office Action dated Apr. 13, 2012 regarding U.S. Appl. No. 12/701,033, 18 pages.
USPTO Office Action dated Jun. 15, 2012 regarding U.S. Appl. No. 13/086,521, 18 pages.
USPTO Office Action dated Nov. 8, 2010 regarding U.S. Appl. No. 12/124,565, 13 pages.
USPTO Final Office Action dated Mar. 15, 2011 regarding U.S. Appl. No. 12/124,565, 14 pages.
USPTO Notice of Allowance dated Aug. 18, 2011 regarding U.S. Appl. No. 12/124,565, 7 pages.
USPTO Office Action dated Feb. 24, 2012 regarding U.S. Appl. No. 12/560,569, 27 pages.
USPTO Final Office Action dated Jul. 24, 2012 regarding U.S. Appl. No. 12/560,569, 23 pages.
USPTO Office Action dated May 10, 2011 regarding U.S. Appl. No. 12/372,616, 27 pages.
USPTO Final Office Action dated Oct. 28, 2011 regarding U.S. Appl. No. 12/372,616, 30 pages.
USPTO Office Action dated Feb. 15, 2012 regarding U.S. Appl. No. 12/372,616, 22 pages.
USPTO Final Office Action dated Jul. 12, 2012 regarding U.S. Appl. No. 12/372,616, 23 pages.
USPTO Office Action dated Feb. 21, 2012 regarding U.S. Appl. No. 12/479,667, 25 pages.
Maggiore et al., "Runway Condition Monitoring", U.S. Appl. No. 12/730,594, filed Mar. 14, 2010, 43 pages.
Vian et al., "Fire Management System", U.S. Appl. No. 13/086,521, filed Apr. 14, 2011, 56 pages.
USPTO Office Action dated Aug. 31, 2012 regarding U.S. Appl. No. 12/701,033, 28 pages.
USPTO non-final office action dated Aug. 16, 2012 regarding U.S. Appl. No. 12/730,594, 25 pages.
USPTO non-final office action dated Aug. 31, 2012 regarding U.S. Appl. No. 12/854,646 19 pages.
"Vector," Merriam-Webster Online Dictionary, 2 pages, retrieved Dec. 4, 2012, from http://web.archive.org/web/20081017075108/http://www.merriam-webster.com/dictionary/vector.
Final Office Action, dated Nov. 16, 2012, regarding U.S. Appl. No. 13/086,521, 24 pages.
Office Action, dated Dec. 6, 2012, regarding U.S. Appl. No. 12/897,158, 51 pages.
Final Office Action, dated Dec. 20, 2012, regarding U.S. Appl. No. 12/730,594, 35 pages.
Office Action, dated Dec. 21, 2012, regarding U.S. Appl. No. 12/372,616, 39 pages.
Final Office Action, dated Jan. 8, 2013, regarding U.S. Appl. No. 12/701,033, 27 pages.
Office Action, dated Sep. 10, 2013, regarding U.S. Appl. No. 12/372,616, 25 pages.
Office Action, dated Sep. 12, 2013, regarding U.S. Appl. No. 12/701,033, 25 pages.
Office Action, dated Aug. 28, 2013, regarding U.S. Appl. No. 12/560,569, 46 pages.
Notice of Allowance, dated Jul. 31, 2013, regarding U.S. Appl. No. 12/854,646, 19 pages.
Final Office Action, dated Jul. 12, 2013, regarding U.S. Appl. No. 12/854,671, 17 pages.
Final Office Action, dated Jun. 26, 2013, regarding U.S. Appl. No. 12/897,158 38 pages.
Final Office Action, dated Oct. 10, 2013, regarding U.S. Appl. No. 12/730,594, 33 pages.
Office Action, dated Nov. 5, 2013, regarding U.S. Appl. No. 13/086,521, 20 pages.
Notice of Allowance, dated Dec. 13, 2013, regarding U.S. Appl. No. 12/854,671, 12 pages.
Final Office Action, dated Apr. 2, 2014, regarding U.S. Appl. No. 12/372,616, 24 pages.
Final Office Action, dated Feb. 21, 2014, regarding U.S. Appl. No. 12/701,033, 31 pages.
Final Office Action, dated Feb. 28, 2014, regarding U.S. Appl. No. 12/560,569, 43 pages.
Notice of Allowance, dated Feb. 27, 2014, regarding U.S. Appl. No. 12/730,594, 11 pages.
Office Action, dated Apr. 8, 2014, regarding U.S. Appl. No. 12/897,158, 33 pages.
Final Office Action, dated Feb. 19, 2014, regarding U.S. Appl. No. 13/086,521, 18 pages.

* cited by examiner

AUTONOMOUS INSPECTION AND MAINTENANCE

BACKGROUND INFORMATION

1. Field

The present disclosure relates generally to maintenance of objects and, in particular, to an automated system for inspection and maintenance of objects. Still more particularly, the present disclosure relates to a method and apparatus for inspecting aircraft structures using an autonomous robotic inspection and maintenance system.

2. Background

Inspection and maintenance of structures may involve the use of machines, tools, human labor, materials, and/or other suitable items for inspecting and maintaining objects. Various inspection techniques may be used to inspect objects, such as aircraft structures, following suspected damage events or to determine whether scheduled or preventative maintenance is required.

Approaches to aircraft maintenance vary by owner and/or operator, but many rely on costly customized manual methods of inspection and maintenance. Existing aircraft sensors may not be designed to provide the information needed to support major inspections and ongoing aircraft maintenance requirements.

Existing maintenance systems may not provide continuous and/or periodic data needed to detect and monitor component conditions. Existing methods may rely on disassembly to inspect hidden areas. Additionally, manual inspection of large external areas may require lengthy periods of time and access to locations around an aircraft.

Therefore, it would be advantageous to have a method and apparatus that takes into account one or more of the issues discussed above, as well as possibly other issues.

SUMMARY

The different advantageous embodiments may provide an apparatus that may comprise a number of mobile robotic machines, a wireless communications system and a computer system. The number of mobile robotic machines may be capable of moving to a number of locations in a maintenance area and may be capable of performing a number of maintenance operations on a structure in the maintenance area. The wireless communications system may be capable of providing communication with the number of mobile robotic machines within the maintenance area. The computer system may be capable of exchanging information with the number of mobile robotic machines using the wireless communications system.

The different advantageous embodiments may further provide a method for inspecting a structure. The method may provide for identifying the structure and establishing communications with a number of mobile robotic machines capable of moving to a number of locations in a maintenance area and capable of performing a number of operations to inspect the structure in the maintenance area using a wireless communications system. An inspection process may be selected and a number of mobile robotic machines may be selected to execute the inspection process. Commands may be sent to the number of mobile robotic machines to inspect the structure using the inspection process.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
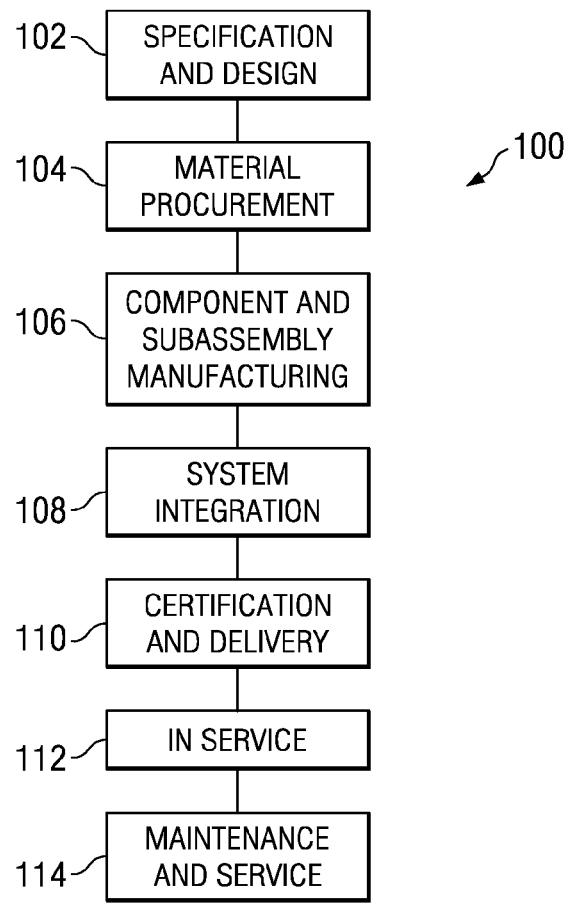
FIG. 1 is an illustration of an aircraft manufacturing and service method in accordance with an advantageous embodiment.
Figure 2:
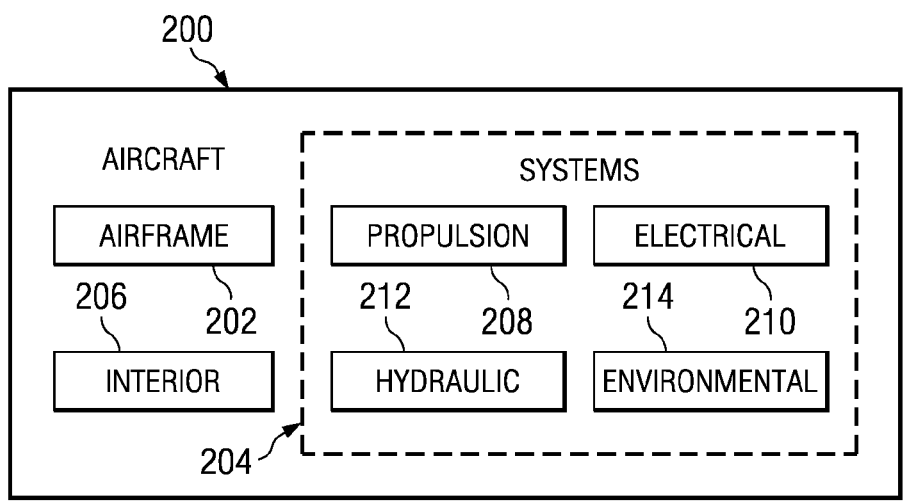
FIG. 2 is illustration of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be inspected while aircraft 200 is in maintenance and service 114 in FIG. 1.

Also, one or more apparatus embodiments, method embodiments, or a combination thereof may be utilized during service stages, such as maintenance and service 114 and service 112 in FIG. 1, for example, without limitation, by substantially expediting the inspection and/or maintenance of aircraft 200.

The different advantageous embodiments take into account and recognize that currently used maintenance systems may not provide continuous and/or periodic data needed to detect and monitor component conditions. The different advantageous embodiments also recognize that existing maintenance methods may rely on disassembly to inspect hidden areas.

The different advantageous embodiments take into account and recognize that currently used inspection and maintenance techniques may require extensive periods of time to accomplish and require access to locations. The different advantageous embodiments also recognize and take into account that a different inspection and maintenance system may be required for different types of aircraft structures. For example, the different advantageous embodiments recognize and take into account that an aircraft inspection and maintenance system designed for inspecting aircraft wings may not be suitable for use in inspecting aircraft fuselages.

Thus, one or more of the different advantageous embodiments may provide an apparatus that may comprise a number of mobile robotic machines, a wireless communications system and a computer system. The number of mobile robotic machines may be capable of moving to a number of locations in a maintenance area and may be capable of performing a number of maintenance operations on a structure in the maintenance area. The wireless communications system may be capable of providing communication with the number of mobile robotic machines within the maintenance area. The computer system may be capable of exchanging information with the number of mobile robotic machines using the wireless communications system.

The different advantageous embodiments may provide a wireless communications system that may be capable of providing communications with the number of mobile robotic machines within the maintenance area. The computer system may be capable of generating commands and programs for the number of mobile robotic machines in the maintenance area and communicating the commands and programs to the number of mobile robotic machines to perform a number of maintenance operations for a structure.

As a specific illustrative example, one or more of the different advantageous embodiments may be implemented, for example, without limitation, during component and subassembly manufacturing 106, system integration 108, certification and delivery 110, service 112, and maintenance and service 114 in FIG. 1 to assemble a structure for aircraft 200. For example, the different advantageous embodiments may be used to inspect at least one of a wing, a fuselage, or some other suitable structure. As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
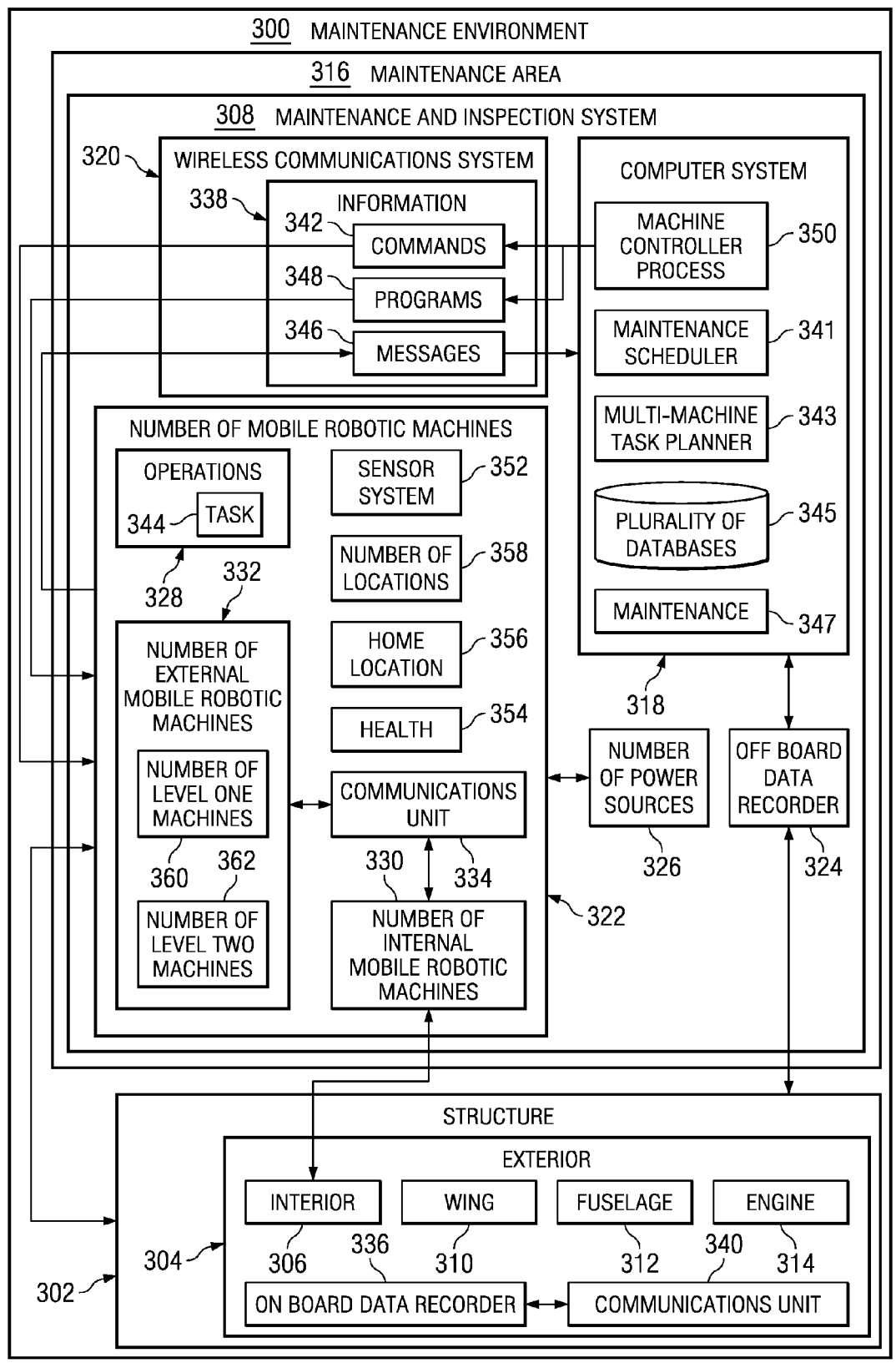
FIG. 3 is an illustration of a maintenance environment in accordance with an advantageous embodiment.

With reference now to FIG. 3, an illustration of a maintenance environment is depicted in accordance with an advantageous embodiment. Maintenance environment 300 may be an example of a maintenance environment that may be used to inspect structure 302. Structure 302 may have exterior 304 and interior 306.

In this illustrative example, maintenance environment 300 may include maintenance and inspection system 308. In the different illustrative examples, maintenance and inspection system 308 may be an autonomous inspection system that may reconfigure itself to perform inspection of different types of structures in a manner faster than currently available inspection systems.

Structure 302 may be a structure such as, for example, aircraft 200 in FIG. 2. Structure 302 may take various forms. For example, structure 302 may be, for example, without limitation, an aircraft, a spacecraft, a submarine, a surface ship, a vehicle, a tank, a building, a manufacturing floor, an engine, and/or some other suitable type of structure. In another illustrative example, structure 302 may be a part of a structure such as, for example, without limitation, wing 310, fuselage 312, engine 314, and/or some other suitable part of a structure.

In this illustrative example, structure 302 may be inspected in maintenance area 316. Maintenance area 316 may include, for example, without limitation, an aircraft hanger, an airport gate, a taxiway, and/or some other suitable area for inspection and maintenance of structure 302.

Maintenance and inspection system 308 may include computer system 318, wireless communications system 320, number of mobile robotic machines 322, off-board data recorder 324, number of power sources 326, and/or other suitable components.

In these illustrative examples, number of mobile robotic machines 322 may perform maintenance operations 328 on structure 302. Maintenance operations 328 may include, for example, without limitation, a macro inspection, a micro inspection, a cleaning operation, a repair operation, and/or some other suitable operation. A macro inspection may be, for example, an overall inspection of an entire structure in order to detect possible inconsistency. A micro inspection may be, for example, a detailed inspection of a specific area of a structure in order to identify and/or characterize a detected possible inconsistency.

In these illustrative examples, number of mobile robotic machines 322 may include, for example, without limitation, number of internal mobile robotic machines 330, number of external mobile robotic machines 332, and/or other suitable types of mobile robotic machines.

Number of internal mobile robotic machines 330 may be capable of performing operations 328 in interior 306 of structure 302. Number of internal mobile robotic machines 330 may move into interior 306 and/or reach into interior 306 of structure 302 to perform operations 328. In another advantageous embodiment, number of internal mobile robotic machines 330 may be permanently located in interior 306 and wirelessly transmit information over wireless communications system 320 using communications unit 334.

Communications unit 334 may be integrated with number of internal mobile robotic machines 330 and number of external mobile robotic machines 332. Communications unit 334, in these examples, provides for communications with other data processing systems or devices. Communications unit 334 may include, for example, without limitation, transmitters, receivers, transceivers, and/or other suitable types of communication devices.

Structure 302 may also include on-board data recorder 336. On-board data recorder 336 may collect data from a number of on-board sensors, on-board computer systems, on-board communication databases, or internal mobile robotic machines 330 while structure 302 is in service, such as service 112 in FIG. 1. In an advantageous embodiment, number of internal mobile robotic machines 330 may detect inconsistency and transmit information 338 over wireless communications system 320 to on-board data recorder 336 for storage, using communications unit 340 on structure 302. During maintenance and inspection, computer system 318 may download information 338 from on-board data recorder 336 and use information 338 to generate commands 342 for inspection of structure 302.

Communications unit 340 may be integrated into structure 302. Communications unit 340, in these examples, provides for communications with other data processing systems or devices. Communications unit 340 may include, for example, without limitation, transmitters, receivers, transceivers, and/ or other suitable types of communication devices.

Number of external mobile robotic machines 332 may perform operations 328 on exterior 304 of structure 302. Number of external mobile robotic machines 332 may comprise number of level one machines 360, number of level two machines 362 and/or other suitable types of mobile robotic machines. In general, speed, payload capabilities, mobility range, and inspection sequence order may be defining characteristics when distinguishing between level one, level two, and subsequent level machines. For example, number of level one machines 360 may be mobile robotic machines capable of macro inspection of a structure such as structure 302. Number of level two machines 362 may be mobile robotic machines capable of micro inspection of a structure such as structure 302. In these illustrative examples, one or more of operations 328 may be grouped together to form a task within tasks 344.

In the illustrative examples, operations 328 may be, for example, without limitation, scanning, sensing, detecting, identifying inconsistency, characterizing inconsistency, capturing images, and/or other suitable types of operations.

Wireless communications system 320 may be used to exchange information 338 between number of mobile robotic machines 322 and/or computer system 318. Information 338 may be exchanged between different machines within number of mobile robotic machines 322 as well as between computer system 318 and number of mobile robotic machines 322. Information 338 may include, for example, without limitation, commands 342, messages 346, programs 348, and/or other suitable types of information.

Messages 346 may be, for example, without limitation, status messages, requests, alerts, errors, queries, sensor data, and/or other suitable types of messages.

Commands 342 and/or programs 348 may be issued by machine controller process 350 executed on computer system 318 and/or other machines within number of mobile robotic machines 322. Machine controller process 350 may be capable of controlling or optimizing performance of maintenance operations 328 by number of mobile robotic machines 322. Programs 348 may contain computer readable instructions in a functional form that can be executed by number of mobile robotic machines 322 to perform operations 328.

Programs 348 may be sent before and/or during execution of operations 328. For example, if a particular mobile robotic machine completes a task, a new program in programs 348 may be sent to that robotic machine by machine controller process 350 to cause the robotic machine to perform a new task.

Commands 342 and programs 348 issued by machine controller process 350 may provide instructions for execution of operations 328. Computer system 318 comprises maintenance scheduler 341, multi-machine task planner 343, plurality of databases 345, and maintenance 347. Maintenance scheduler 341 may interact with plurality of databases 345 to identify maintenance 347 for structure 302. Maintenance 347 may be, for example, without limitation, schedule-driven maintenance, event-driven maintenance, preventative maintenance, regulation defined maintenance, and/or other suitable maintenance for structure 302.

Multi-machine task planner 343 may process maintenance 347 identified by maintenance scheduler 341, and may identify a number of number of external mobile robotic machines 332 and a number of number of internal mobile robotic machines 330 necessary to perform maintenance 347. Multi-machine task planner 343 may divide maintenance 347 into tasks 344 and may assign tasks 344 to number of external mobile robotic machines 332 and number of internal mobile robotic machines 330 that may have been identified to perform operations 328. Multi-machine task planner 343 may then send tasks 344 to machine controller process 350, and machine controller process 350 may generate commands 342 for number of mobile robotic machines 322 to execute operations 328 to perform maintenance 347.

Sensor system 352 may be located on number of mobile robotic machines 322, and/or throughout different locations within maintenance area 316. Sensor system 352 may include a number of a number of different types of sensors. For example, without limitation, sensor system 352 may include, without limitation, a camera, a receiver capable of receiving positioning system information, an infrared scanner, an electromechanical fatigue sensor, a microelectromechanical system (MEMS) device, and/or some other suitable sensor for maintenance and inspection of a structure.

Off board data recorder 324 may supplement autonomous inspection in order to confirm a detected inconsistency. Off board data recorder 324 may also be used to test health 354 of number of mobile robotic machines 322.

Number of power sources 326 may provide power to components of maintenance and inspection system 308, such as number of mobile robotic machines 322, for example. Number of power sources 326 may include, without limitation, a battery, a mobile battery recharger, a networked autonomous battery recharger, energy harvesting devices, photo cells, and/or other suitable power sources.

With maintenance and inspection system 308, number of mobile robotic machines 322 may move from home location 356 to number of locations 358 to perform operations 328 and/or to perform maintenance 347 on structure 302. In the different advantageous embodiments, number of mobile robotic machines 322 may move and/or change locations within number of locations 358 during the performance of operations 328.

When operations 328 are completed, number of mobile robotic machines 322 in maintenance and inspection system 308 may move to home location 356. This movement may leave maintenance area 316 clear and ready for other types of operations.

Computer system 318 also may monitor the health of various components in maintenance and inspection system 308. For example, computer system 318 may monitor health 354 for number of mobile robotic machines 322. The level and/or amount of power in number of power sources 326 also may be monitored by computer system 318.

The illustration of maintenance environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, the components of computer system 318 may be distributed throughout maintenance area 316 or across locations remote from maintenance area 316. Plurality of databases 345 may be located in a remote location from computer system 318 or may be integrated with computer system 318. Further, a particular mobile robotic machine within number of mobile robotic machines 322 may perform more than one task. As one task is completed in inspection of structure 302, a mobile robotic machine may receive a new program to perform another task needed to complete inspection of structure 302.

Figure 4:
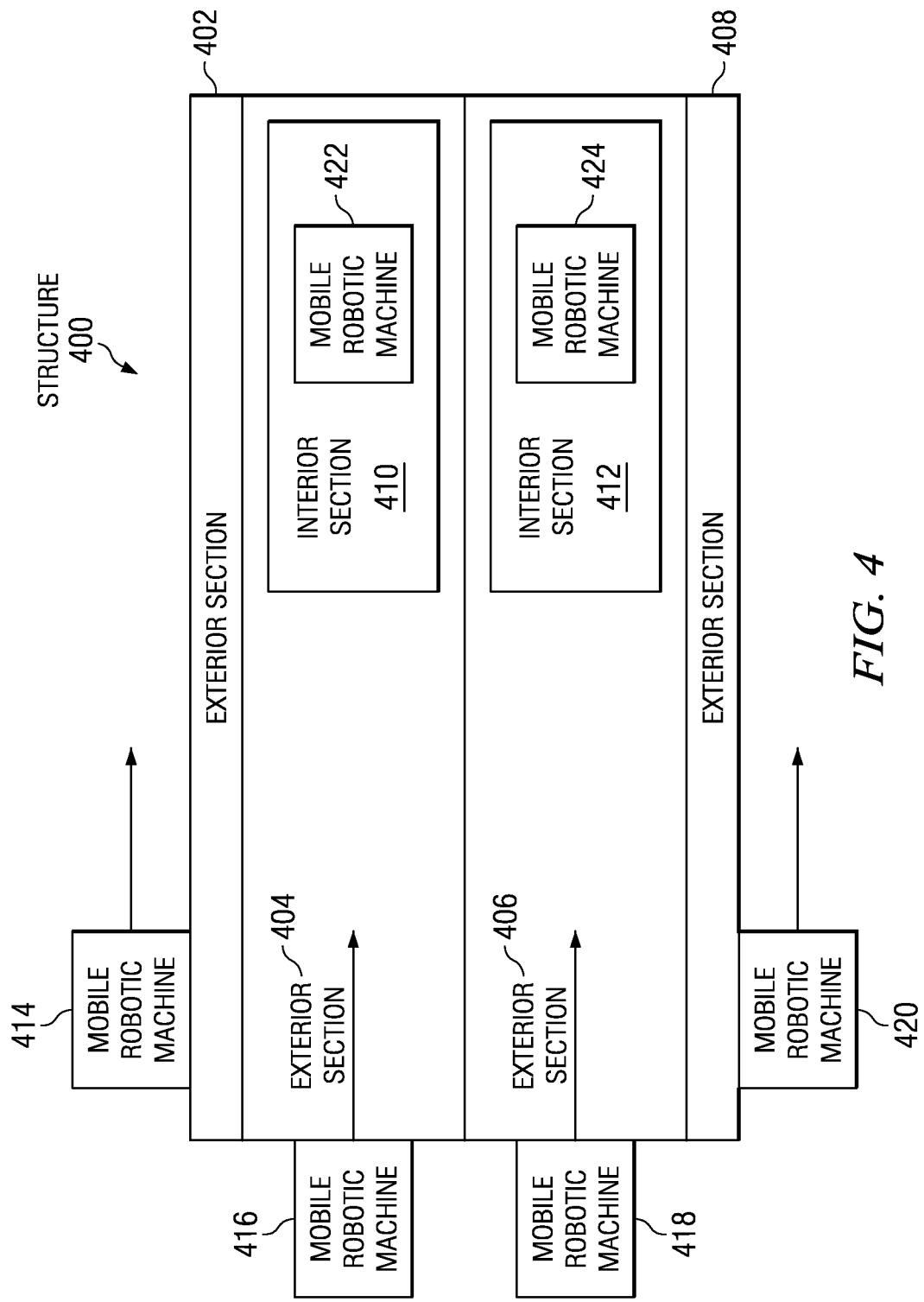
FIG. 4 is an illustration of an inspection process in accordance with an advantageous embodiment.

Turning now to FIG. 4, an illustration of an inspection process is depicted in accordance with an advantageous embodiment. In this illustrative example, structure 400 may be an example of structure 302 in FIG. 3.

In this illustrative example, structure 400 may be divided into external and internal sections. Structure 400 comprise exterior sections 402, 404, 406, and 408 and interior sections 410 and 412. Mobile robotic machines 414, 416, 418, and 420 are an illustrative example of number of external mobile robotic machines 332 in FIG. 3. Mobile robotic machines 414, 416, 418, and 420 may move simultaneously to inspect exterior section 402, 404, 406, and 408 on structure 400. For example, mobile robotic machine 414 may inspect exterior section 402, mobile robotic machine 416 may inspect exterior section 404, mobile robotic machine 418 may inspect exterior section 406, and mobile robotic machine 420 may inspect exterior section 408.

In an advantageous embodiment, mobile robotic machine 416 and mobile robotic machine 418 may be level one machines, such as number of level one machines 360 in FIG. 3. Mobile robotic machine 416 and mobile robotic machine 418 may be deployed first for macro inspection of structure 400. If mobile robotic machine 416 and mobile robotic machine 418 detect inconsistency on structure 400, mobile robotic machine 414 and mobile robotic machine 420 may be deployed second for micro inspection of sections of structure 400 where inconsistencies were detected by mobile robotic machine 416 and mobile robotic machine 418. Mobile robotic machine 414 and mobile robotic machine 420 may be level two machines, such as number of level two machines 362 in FIG. 3. Inconsistency may be, for example, without limitation, parameters outside of design tolerance.

In one illustrative example, mobile robotic machines 414, 416, 418, and 420 may be located directly on the surface of structure 400. In another illustrative example, mobile robotic machines 414, 416, 418, and 420 may be located in the air around structure 400. In yet another illustrative example, mobile robotic machines 414, 416, 418, and 420 may be located on the ground of a maintenance area, such as maintenance area 316 in FIG. 3, surrounding structure 400.

Mobile robotic machines 422 and 424 are an illustrative example of number of internal mobile robotic machines 330 in FIG. 3. Mobile robotic machines 422 and 424 may move simultaneously to inspect interior sections 410 and 412. For example, mobile robotic machine 422 may inspect interior section 410 and mobile robotic machine 424 may inspect interior section 412. In an advantageous embodiment, mobile robotic machine 422 may be an example of an internal mobile robotic machine that may be permanently located in interior section 410. With this type of implementation, mobile robotic machine 422 may wirelessly transmit information about interior section 410 to a computer system such as computer system 318 in FIG. 3.

In an advantageous embodiment, mobile robotic machines 414, 416, 418, and 420 and mobile robotic machine 422 and 424 may perform simultaneous inspection operations to cover inspection of respective exterior and interior sections of structure 400. In another advantageous embodiment, mobile robotic machines 414, 416, 418, and 420 and mobile robotic machine 422 and 424 may perform tiered inspection operations of structure 400. Mobile robotic machines may use various processes for covering inspection of structure 400, such as, without limitation, vertex ant walk processes, mark and cover processes, trajectory construction using Lin-Kernighan (LK) processes, boustrophedon cellular decomposition processes, and/or other suitable processes for covering inspection of an area and/or surface.

The illustration of the inspection process for structure 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
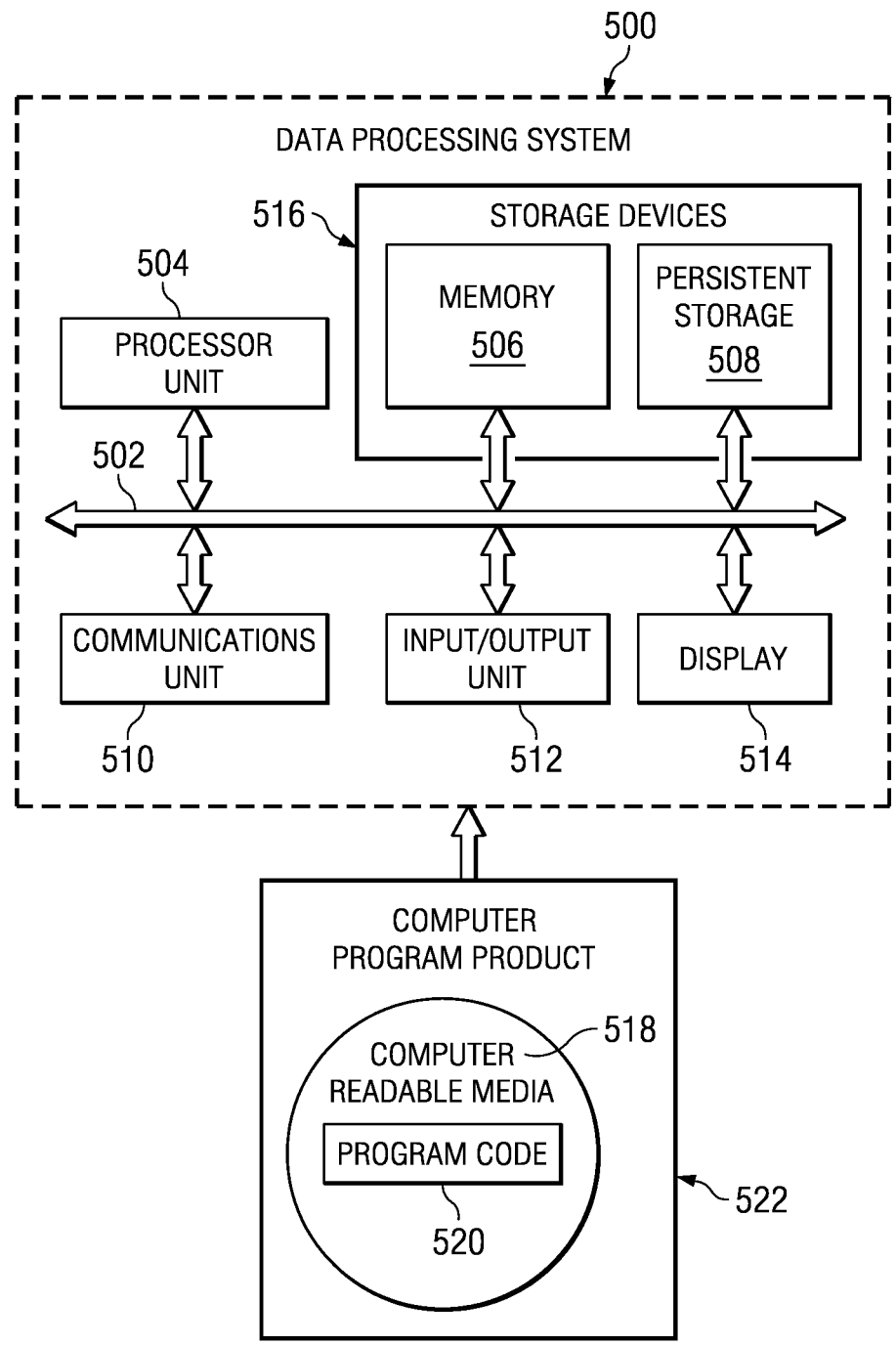
FIG. 5 is an illustration of a data processing system in accordance with an illustrative embodiment.

Turning now to FIG. 5, an illustration of a data processing system is depicted in accordance with an illustrative embodiment. Data processing system 500 may be used to implemented different computers and data processing systems within maintenance environment 300 in FIG. 3. For example, without limitation, data processing system 500 may be used to implement one or more computers in computer system 318 in FIG. 3. As yet another illustrative example, data processing system 500 may be used in one or more of number of robotic machines 322 in FIG. 3.

In this illustrative example, data processing system 500 includes communications fabric 502, which provides communications between processor unit 504, memory 506, persistent storage 508, communications unit 510, input/output (I/O) unit 512, and display 514. Data processing system 500 may be used in computer system 318, wireless communications system 320, and within number of mobile robotic machines 322 in FIG. 3. Depending on the particular implementation, different architectures and/or configurations of data processing system 500 may be used.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device may be any piece of hardware that may be capable of storing information, such as, for example without limitation, data, program code in functional form, and/or other suitable information either on a temporary basis and/or a permanent basis. Memory 506, in these examples, may be, for example, a random access memory or any other suitable volatile or non-volatile storage device. Persistent storage 508 may take various forms depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 may be a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications and/or programs may be located in program code 516, which are in communication with processor unit 504 through communications fabric 502. In these illustrative examples the instruction are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 520 may be located in a functional form on computer readable media 518 that may be selectively removable and may be loaded onto or transferred to data processing system 500 for execution by processor unit 504. Program code 520 and computer readable media 518 form computer program product 522 in these examples. In one example, computer readable media 518 may be in a tangible form, such as, for example, an optical or magnetic disc that may be inserted or placed into a drive or other device that may be part of persistent storage 508 for transfer onto a storage device, such as a hard drive that may be part of persistent storage 508. In a tangible form, computer readable media 518 also may take the form of a persistent storage, such as a hard drive, a thumb drive, or a flash memory that may be connected to data processing system 500. The tangible form of computer readable media 518 may also be referred to as computer recordable storage media. In some instances, computer readable media 518 may not be removable.

Alternatively, program code 520 may be transferred to data processing system 500 from computer readable media 518 through a communications link to communications unit 510 and/or through a connection to input/output unit 512. The communications link and/or the connection may be physical or wireless in the illustrative examples. The computer readable media also may take the form of non-tangible media, such as communications links or wireless transmissions containing the program code.

In some illustrative embodiments, program code 520 may be downloaded over a network to persistent storage 508 from another device or data processing system for use within data processing system 500. For instance, program code stored in a computer readable storage medium in a server data processing system may be downloaded over a network from the server to data processing system 500. The data processing system providing program code 520 may be a server computer, a client computer, or some other device capable of storing and transmitting program code 520.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 500 may be any hardware apparatus that may store data. Memory 506, persistent storage 508 and computer readable media 518 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

Figure 6:
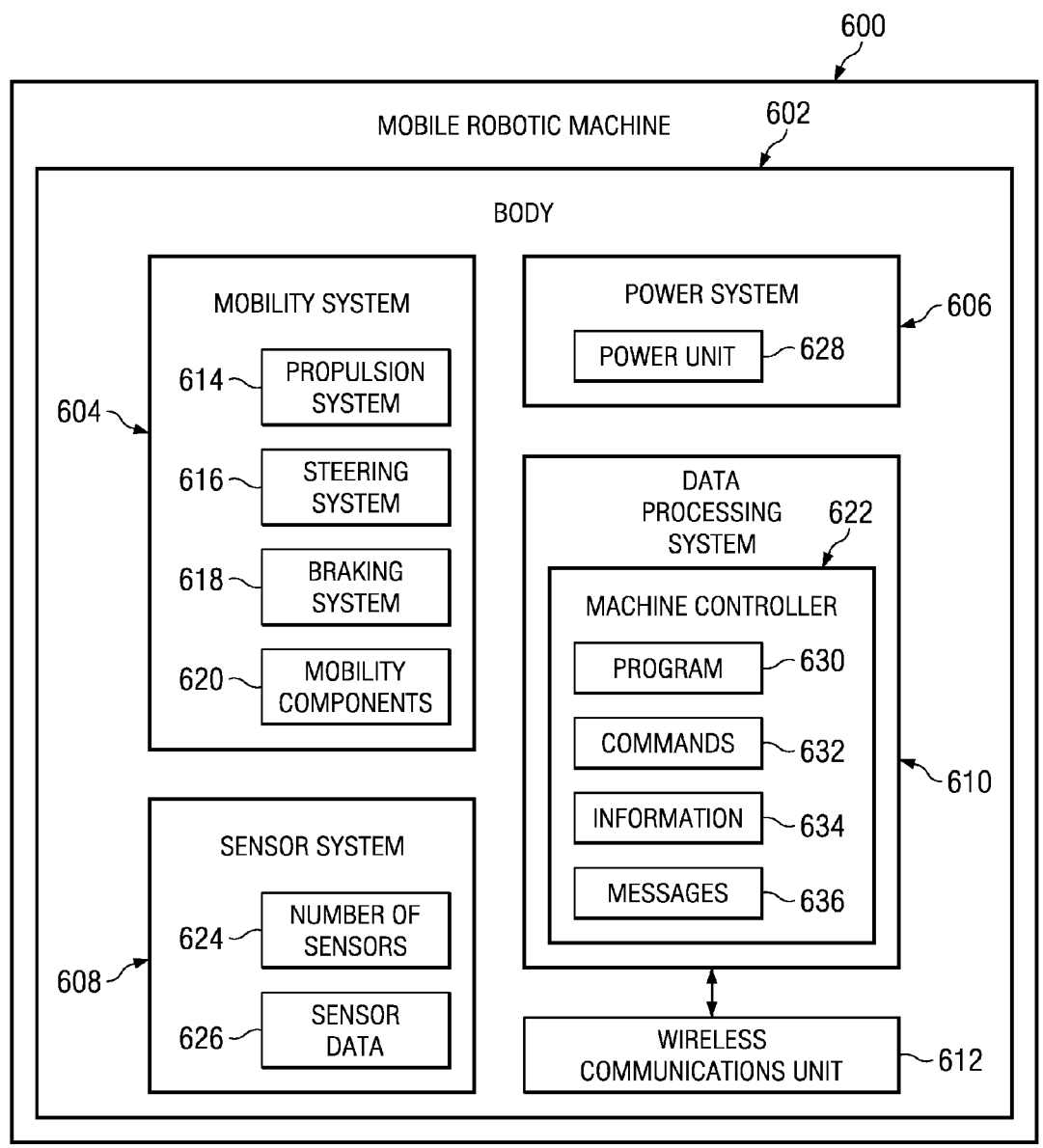
FIG. 6 is an illustration of a mobile robotic machine in accordance with an advantageous embodiment.

Turning now to FIG. 6, an illustration of a mobile robotic machine is depicted in accordance with an advantageous embodiment. Mobile robotic machine 600 may be an example of one manner in which number of mobile robotic machines 322 in FIG. 3 may be implemented. Mobile robotic machine 600 may be autonomous and may perform operations without requiring continuous instructions from different sources.

As illustrated, mobile robotic machine 600 may include body 602, mobility system 604, power system 606, sensor system 608, data processing system 610, wireless communications unit 612, and/or other suitable components.

Body 602 may provide a structure and/or housing for which different components may be located on and/or in mobile robotic machine 600. Mobility system 604 may provide mobility for mobile robotic machine 600. Mobility system 604 may take various forms.

Mobility system 604 may include, for example, without limitation, propulsion system 614, steering system 616, braking system 618, and mobility components 620. In these examples, propulsion system 614 may propel or move mobile robotic machine 600 in response to commands from machine controller 622 in data processing system 610. Propulsion system 614 may maintain or increase the speed at which a mobile robotic machine moves in response to instructions received from machine controller 622 in data processing system 610. Propulsion system 614 may be an electrically controlled propulsion system. Propulsion system 614 may be, for example, an internal combustion engine, an internal combustion engine/electric hybrid system, an electric engine, or some other suitable propulsion system.

Steering system 616 may control the direction or steering of mobile robotic machine 600 in response to commands received from machine controller 622 in data processing system 610. Steering system 616 may be, for example, an electrically controlled hydraulic steering system, an electrically driven rack and pinion steering system, a differential steering system, or some other suitable steering system.

Braking system 618 may slow down and/or stop mobile robotic machine 600 in response to commands received from machine controller 622 in data processing system 610. Braking system 618 may be an electrically controlled braking system. This braking system may be, for example, a hydraulic braking system, a friction braking system, or some other suitable braking system that may be electrically controlled.

Mobility components 620 may provide mobile robotic machine 600 with the capability to move in a number of directions and/or locations in response to instructions received from machine controller 622 in data processing system 610 and executed by propulsion system 614, steering system 616, and braking system 618. Mobility components 620 may be, for example, without limitation, wheels, tracks, feet, rotors, propellers, wings, and/or other suitable components.

Sensor system 608 may comprise number of sensors 624 and sensor data 626. For example, number of sensors 624 may include, without limitation, a camera, a scanner, an electromechanical fatigue sensor, a microelectromechanical system (MEMS) device, and/or some other suitable type of sensor. Sensor data 626 may be information collected by number of sensors 624.

Power system 606 may provide power to operate mobile robotic machine 600. Power system 606 may generate power using power unit 628. Power unit 628 may be an illustrative example of number of power sources 326 in FIG. 3. Power unit 628 may be removable and/or replaceable. Power unit 628 may be changed when power unit 628 becomes depleted.

Power unit 628 may be, for example, without limitation, a battery and/or some other suitable type of power unit. For example, power unit 628 may be a wireless transfer unit capable of receiving power without using wires.

Data processing system 610 may control the operation of mobile robotic machine 600 using machine controller 622 to execute program 630 and transmit commands 632 in these examples. Program 630 may be received from a computer system, such as computer system 318 in FIG. 3, through wireless communications unit 612 and/or some other source. In these illustrative examples, wireless communications unit 612 may provide the capability to transfer information, such as program 630 and commands 632, between mobile robotic machine 600 and other components within maintenance environment 300 in FIG. 3, such as computer system 318 in FIG. 3.

In one advantageous embodiment, program 630 and commands 632 are illustrative examples of programs 348 and commands 342 in FIG. 3, generated by computer system 318 in FIG. 3 and transmitted over wireless communications system 320 to number of mobile robotic machines 322 in FIG. 3. In another advantageous embodiment, programs 630 and commands 632 may be generated by data processing system 610 based on information 634 received through wireless communications unit 612 and/or some other source. Information 634 may be, for example, information about maintenance requirements for a structure.

Data processing system 610 further receives sensor data 626 from sensor system 608 and generates message 636. Message 636 may be transmitted through wireless communications unit 612 to another component and/or device in maintenance environment 300 in FIG. 3.

Mobile robotic machine 600 may provide a capability to move to different locations without requiring cables, fixed attachments, rails, and/or other components currently used by robotic machines in inspection systems.

The illustration of mobile robotic machine 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, machine controller 622 may be unnecessary. Machine controller 622 may be unnecessary if data processing system 610 directly receives programs 630 and commands 632 from a machine controller located remote from mobile robotic machine 600, such as machine controller process 350 in computer system 318 of FIG. 3. In yet other advantageous embodiments, mobile robotic machine 600 may include additional systems for inspection and maintenance not depicted here.

Mobile robotic machine 600 may be an example of a machine that may be used to implement one or more of number of mobile robotic machines 322 in FIG. 3. For example, mobile robotic machine 600 may be used to implement an external mobile robotic machine, an internal mobile robotic machine, and/or some other suitable type of mobile robotic machine.

Figure 7:
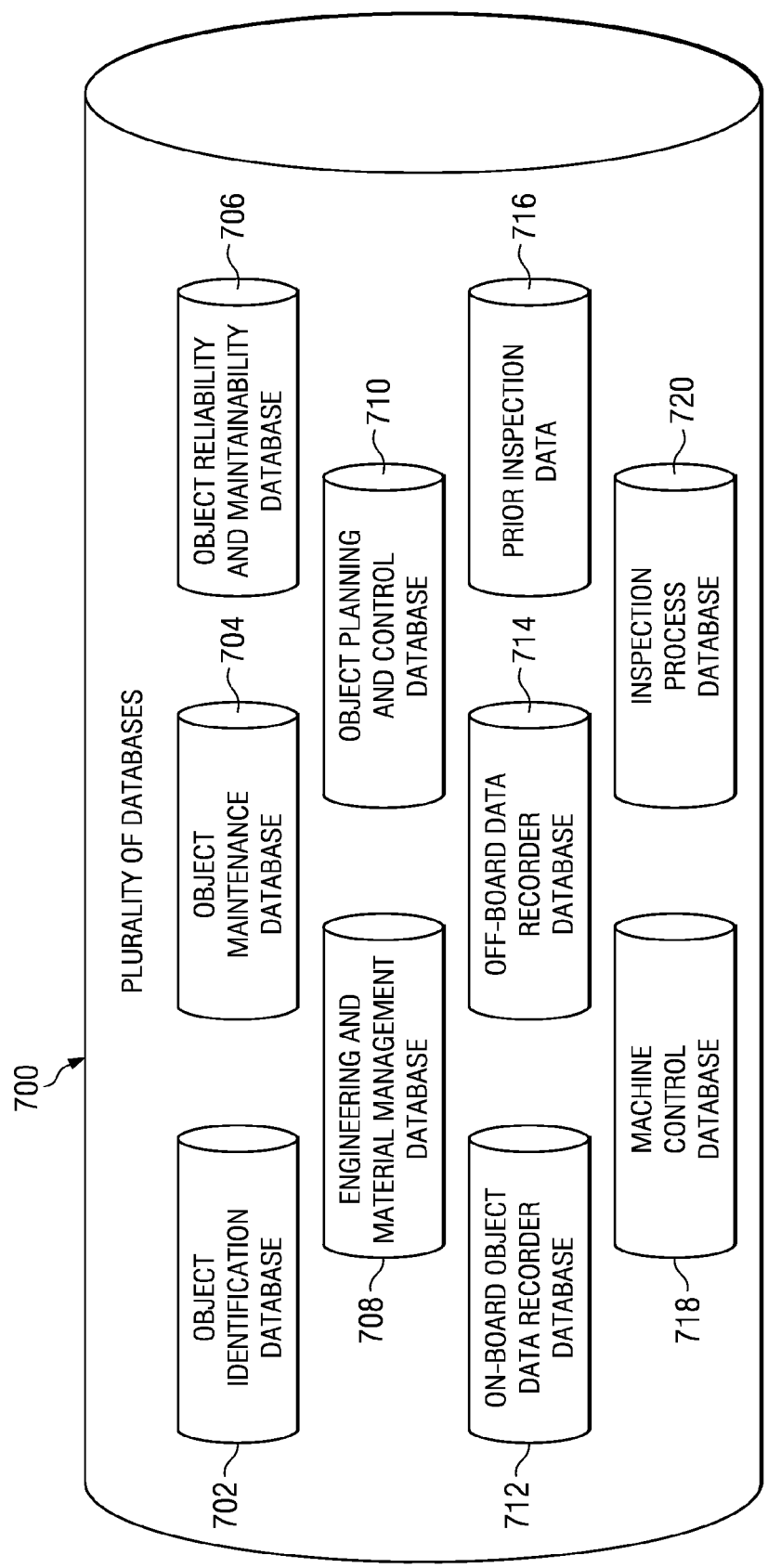
FIG. 7 is an illustration of a plurality of databases in accordance with an advantageous embodiment.

With reference now to FIG. 7, an illustration of a plurality of databases is depicted in accordance with an advantageous embodiment. Plurality of databases 700 may be an example of one implementation for plurality of databases 345 in FIG. 3.

Plurality of databases 700 may include object identification database 702, object maintenance database 704, object reliability and maintainability database 706, engineering and material management database 708, object planning and control database 710, on-board object data recorder database 712, off-board data recorder database 714, prior inspection data 716, machine control database 718, inspection process database 720, and/or other suitable information.

Object identification database 702 may contain the identification information for a number of different types and models of objects. In an illustrative example, identification information for different aircraft models may include, without limitation, major and minor model numbers, tail numbers, customer unique numbers, engineering and manufacturing effectivity numbers, and/or any other suitable information.

Object maintenance database 704 may contain information about the maintenance history for a given object identified in object identification database 702. The maintenance history of an object may be used in conjunction with the maintenance planning data in object planning and control database 710 to determine what regulatory and/or compliance measures may need to be taken in the next maintenance session in order to maintain regulatory compliance. Object maintenance database 704 may also contain past modification information, component or configuration options that are exercised, status on service bulletin incorporation, past repair information, any manufacturing deviations detected in previous inspections of the object, and/or any other suitable information.

Object reliability and maintainability database 706 may contain object specific information about repair consumables, replacement part availability, regulatory requirements for repairs and replacement parts, mean time between failure information, mean time to repair/replace information for a given object, and/or any other suitable information. For example, in the illustrative example of an aircraft, Air Transport Association (ATA) chapter assignments defining the hierarchy of the aircraft system for a particular aircraft may be contained within object reliability and maintainability database 706.

Engineering and material management database 708 may contain object configuration information, electronic geometry files for a given object, and/or any other suitable information. In the illustrative example of an aircraft, engineering and material management database 708 may contain computer aided three dimensional interactive application (CATIA) geometry files and aircraft configuration information for a specific model and/or type of aircraft.

Object planning and control database 710 may contain maintenance planning data for each object model defined in object identification database 702. In an illustrative example of an aircraft, this maintenance planning data may describe what preventative maintenance may be performed to maintain airworthiness and federal compliance for the given aircraft. This information may include regulatory requirements, service bulletins, and/or other suitable information. Maintenance planning data may also include aircraft historical usage information, past and future near-term scheduled flight routes, and future maintenance availability schedule.

On-board object data recorder database 712 may contain stored information transmitted from an on-board object data recorder, such as on-board object data recorder 336 on structure 302 in FIG. 3. Off-board data recorder database 714 may contain stored information transmitted from an off-board data recorder, such as off-board data recorder 324 in FIG. 3.

Prior inspection data 716 may contain stored information transmitted from a number of mobile robotic machines and/or a number of sensor systems from past inspections of a structure. Prior inspection data 716 may include object identifiers to uniquely identify prior inspection data for a particular object.

Machine control database 718 may contain a number of stored programs for execution by a machine controller, such as machine controller process 350 in FIG. 3.

Inspection process database 720 may contain a number of different types of processes for covering inspection of a structure, such as structure 400 in FIG. 4, for example. Inspection process database 720 may include processes such as, without limitation, vertex ant walk processes, mark and cover processes, trajectory construction using Lin-Kernighan (LK) processes, boustrophedon cellular decomposition processes, and/or other suitable processes for covering inspection of an area and/or surface.

The illustration of plurality of databases 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional databases not shown may be included in plurality of databases 700. In some advantageous embodiments, object identification database 702 may be integrated with object maintenance database 704, for example.

Figure 8:
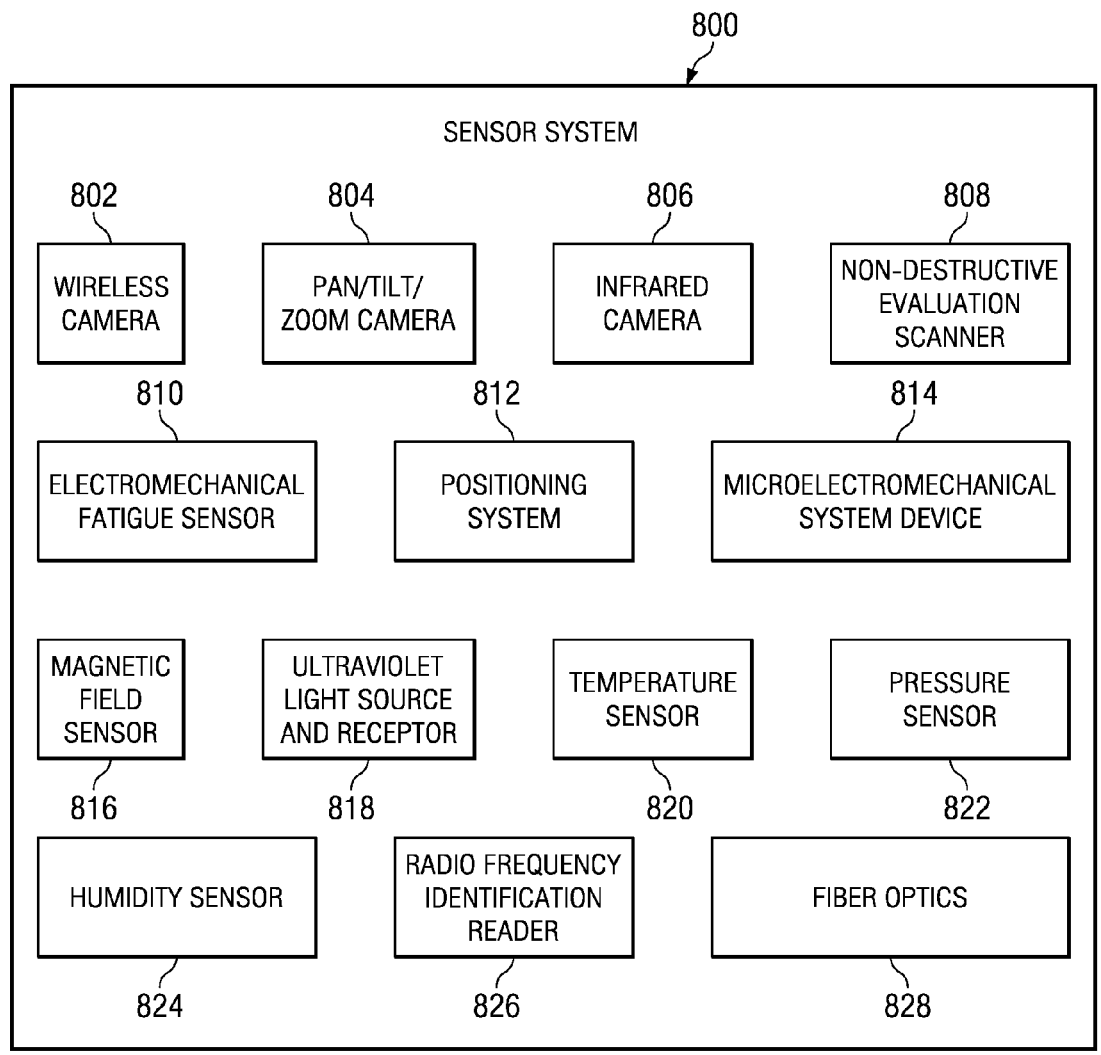
FIG. 8 is an illustration of a sensor system in accordance with an advantageous embodiment.

With reference now to FIG. 8, an illustration of a sensor system is depicted in accordance with an advantageous embodiment. Sensor system 800 may be an example of one implementation of sensor system 352 in FIG. 3. Sensor system 800 may be located on a number of mobile robotic machines, such as number of mobile robotic machines 322 in FIG. 3. Sensor system 800 may detect parameters such as, for example, without limitation, visual information, temperature information, humidity information, radiation outside the visual spectrum, structural frequency response information, non-visible light source reflection, air pressure, fluid pressure, gaseous pressures, strain or amount of deflection in a component, and/or any other suitable parameter.

Sensor system 800 may include wireless camera 802, pan/tilt/zoom camera 804, infrared camera 806, non-destructive evaluation scanner 808, electromechanical fatigue sensor 810, positioning system 812, microelectromechanical system (MEMS) device 814, magnetic field sensor 816, ultraviolet light source and receptor 818, temperature sensor 820, pressure sensor 822, humidity sensor 824, radio frequency identification reader 826, fiber optics 828, and/or other suitable sensor components.

Wireless camera 802 may be any type of wireless visible light camera that may capture visual information such as still and/or moving images, for example. Wireless camera 802 may transmit the images over a wireless connection to a computer system. In an illustrative example, wireless camera 802 may be an indoor WiFi 802.11b wireless camera used for remote monitoring and surveillance over either local area networks or the Internet.

Pan/tilt/zoom camera 804 may be any camera capable of panning, tilting, and zooming in order to capture visual information such as still and/or moving images, for example. Panning may refer to the horizontal movement or rotation of the camera. Tilting may refer to the vertical movement or rotation of the camera. Zooming may refer to the ability to vary the focal length and angle of the lens of the camera.

Infrared camera 806 may form an image using infrared radiation, rather than visible light. In the illustrative example of an aircraft, infrared camera 806 may be utilized to improve an acquired image contrast ratio based on thermal intensity, thus increase the likelihood of detecting overheated items, such as aircraft brakes, bearings, gears, or components within engine 314. In one illustrative example, infrared camera 806 may detect overheated aircraft brakes by showing a noticeable contrast to nearby and surrounding vehicle structures in relation to the aircraft brakes when viewed in the infrared spectrum. The noticeable contrast may be due to a temperature difference in the aircraft brake materials from the materials of the surrounding structures, for example.

Non-destructive evaluation scanner 808 may use electromagnetic radiation and microscopy to examine surfaces in detail. Non-destructive evaluation scanner 808 may be used to detect radiation outside the visual spectrum. The examination may often be reasonably obvious, especially when different light sources are used. For example, glancing light on a surface of a structure may reveal details not immediately obvious to sight. Type of electromagnetic radiation used may include, without limitation, X-rays, ultrasound, and/or other suitable electromagnetic radiation.

Electromechanical fatigue sensor 810 may use piezoelectric devices to provide information about the airplane structural condition that results from long term mechanical loading. Electromechanical fatigue sensor 810 may be used to detect structural frequency response information, for example.

Positioning system 812 may identify the location of the mobile robotic machine with respect to other objects in the maintenance environment. Positioning system 812 may be any type of vision-based motion capture or radio frequency triangulation scheme based on signal strength and/or time of flight. Examples include, without limitation, the Global Positioning System, Glonass, Galileo, cell phone tower relative signal strength, and/or any other suitable system. Position may be typically reported as latitude and longitude with an error that depends on factors, such as, without limitation, ionospheric conditions, satellite constellation, signal attenuation from environmental factors, and/or other suitable factors.

Microelectromechanical system (MEMS) device 814 may be used to sense such parameters as pressure, temperature, humidity, acceleration, and rotation using the small, lightweight, and low-power nature of MEMS technologies. This also includes nanoelectromechanical systems (NEMS) which are similar to MEMS, but smaller and may be used to sense small displacements and forces at the molecular scale.

Magnetic field sensor 816 may be a sensor used to measure the strength and/or direction of the magnetic field in the vicinity of magnetic field sensor 816. Magnetic field sensor 816 may also measure variations in magnetic fields near the sensor. In one illustrative example, magnetic field sensor 816 may non-intrusively measure electric current flowing through a nearby electrical circuit.

Ultraviolet light source and receptor 818 may emit and detect ultraviolet light. Ultraviolet light may be electromagnetic radiation with a wavelength shorter than that of visible light. Ultraviolet light may be used to detect inconsistencies such as, for example, fluid leaks or other residues that are difficult to identify in a visible light spectrum. Ultraviolet light source and receptor 818 may detect the bounce-back of ultraviolet light wavelengths from the emission of ultraviolet light. Ultraviolet light source and receptor 818 may transform the bounce-back wavelengths into a visible light spectrum viewable by a human eye.

Temperature sensor 820 may detect the ambient temperature of the operating environment around temperature sensor 820. In an illustrative example, temperature sensor 820 may be a thermocouple or thermistor.

Pressure sensor 822 may measure the pressure of force in an operating environment around pressure sensor 822. Pressure sensor 822 may detect the pressure of force caused by, for example, without limitation, air pressure, fluidic pressure, and/or gaseous pressure. In an illustrative example, pressure sensor 822 may be a fiber optic, mechanical deflection, strain gauge, variable capacitive, or silicon piezoresistive pressure sensor.

Humidity sensor 824 may measure relative humidity in an operating environment around humidity sensor 824. In an illustrative example, humidity sensor 824 may be a hygrometer, resistive, or capacitive relative humidity sensor.

Radio frequency identification reader 826 may rely on stored data and remotely retrieve the data using devices such as radio frequency identification (RFID) tags or transponders. Radio frequency identification tags may be located, for example, on required equipment for an object. In the illustrative example of an aircraft, radio frequency identification tags may be located on required equipment such as, without limitation, life vests, batteries, a black box, and/or other suitable equipment. Radio frequency identification reader 826 may detect the radio frequency identification tags located on various equipment and retrieve data in order for sensor system to detect whether or not required equipment is found on and/or within the object begin inspected.

Fiber optics 828 may contain a collection of optical fibers that permit transmission over longer distances and at higher data rates than other forms of communications. Fiber optics 828 may be used, for example, without limitation, to measure strain and/or detect the amount of deflection in a component. Fiber optics 828 may be immune to electromagnetic interference. In an illustrative example, fiber optics may be used in a borescope to acquire images or video of hard to reach areas within an airplane structure.

The illustration of sensor system 800 in FIG. 8 is not meant to imply physical or architectural limitations to the manner in which different advantageous embodiments may be implemented. Other components in addition to, and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional sensors not shown may be included in sensor system 800. In another example, in some advantageous embodiments, sensors may be integrated together in a sensor suite, such as electromechanical fatigue sensor 810 and microelectromechanical system device 814, for example.

Figure 9:
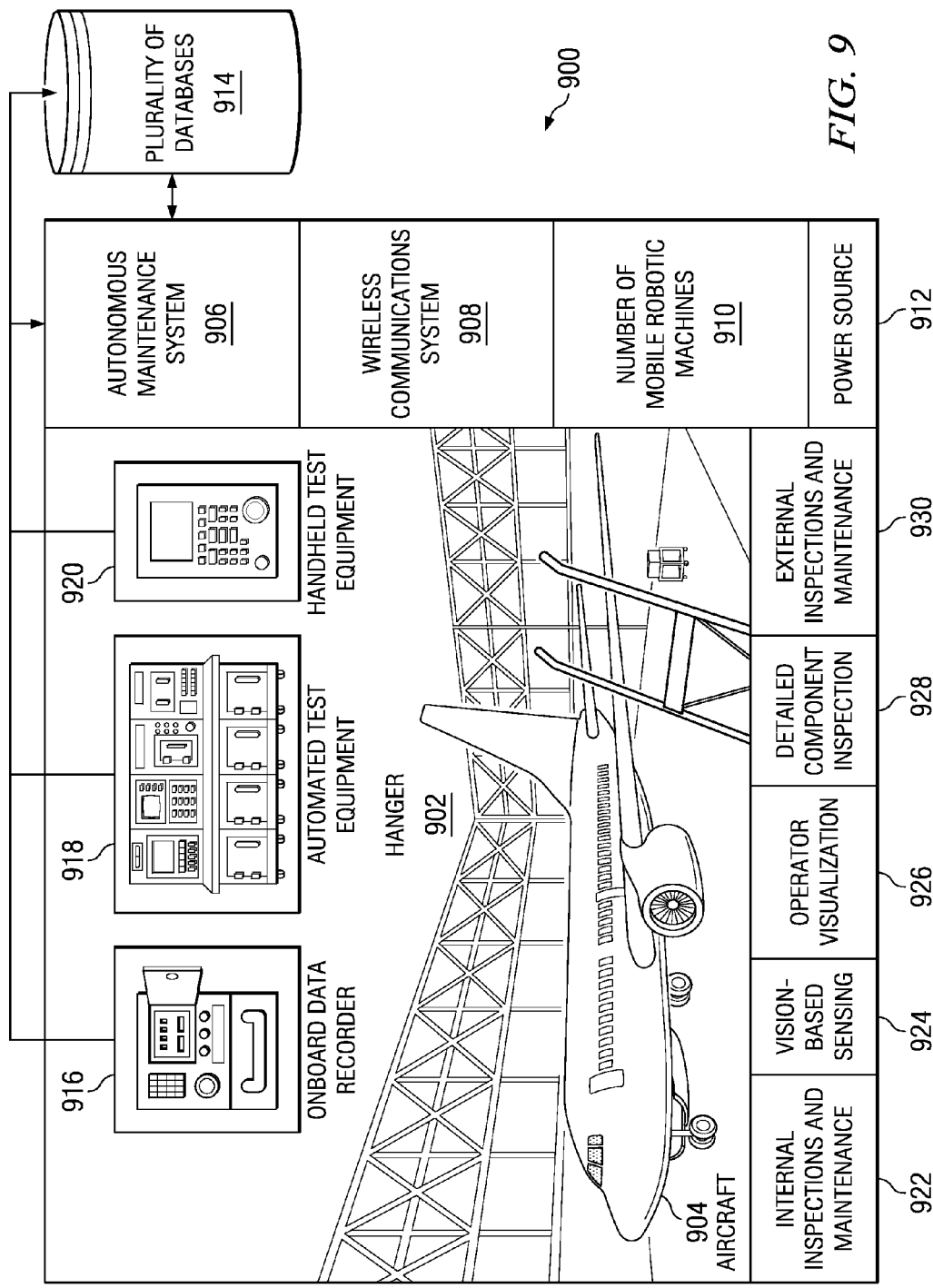
FIG. 9 is an illustration of a maintenance environment in accordance with an advantageous embodiment.

With reference now to FIG. 9, an illustration of a maintenance environment is depicted in accordance with an advantageous embodiment. Maintenance environment 900 may be one example of one implementation of maintenance environment 300 in FIG. 3.

Maintenance environment 900 may include maintenance hanger 902. Maintenance hanger 902 may be an example of one implementation of maintenance area 316 in FIG. 3. Aircraft 904 may be an example of one implementation of structure 302 in FIG. 3. Aircraft 904 may be moved into maintenance hanger 902 for maintenance and inspection by autonomous maintenance system 906. Autonomous maintenance system 906 may be an example of one implementation of maintenance and inspection system 308 in FIG. 3.

Wireless communications system 908 may be an example of one implementation of wireless communications system 320 in FIG. 3. Number of mobile robotic machines 910 may be an example of one implementation of number of mobile robotic machines 322 in FIG. 3. Power sources 912 may be an example of one implementation of number of power sources 326 in FIG. 3. Plurality of databases 914 may be an example of one implementation of plurality of databases 345 in FIG. 3. Plurality of databases 914 may receive data from onboard data recorder 916. Automated test equipment 918 and handheld test equipment 920 may be illustrative examples of one implementation of off-board data recorder 324 in FIG. 3.

Autonomous maintenance system 906 may send commands over wireless communications system 908 to number of mobile robotic machines 910 to perform maintenance operations on aircraft 904 in maintenance hanger 902. Number of mobile robotic machines 910 may perform at least one of internal inspections and maintenance 922, vision-based sensing 924, operator visualization 926, detailed component inspection 928, external inspection and maintenance 930, and/or some other suitable inspection and maintenance of aircraft 904.

Figure 10:
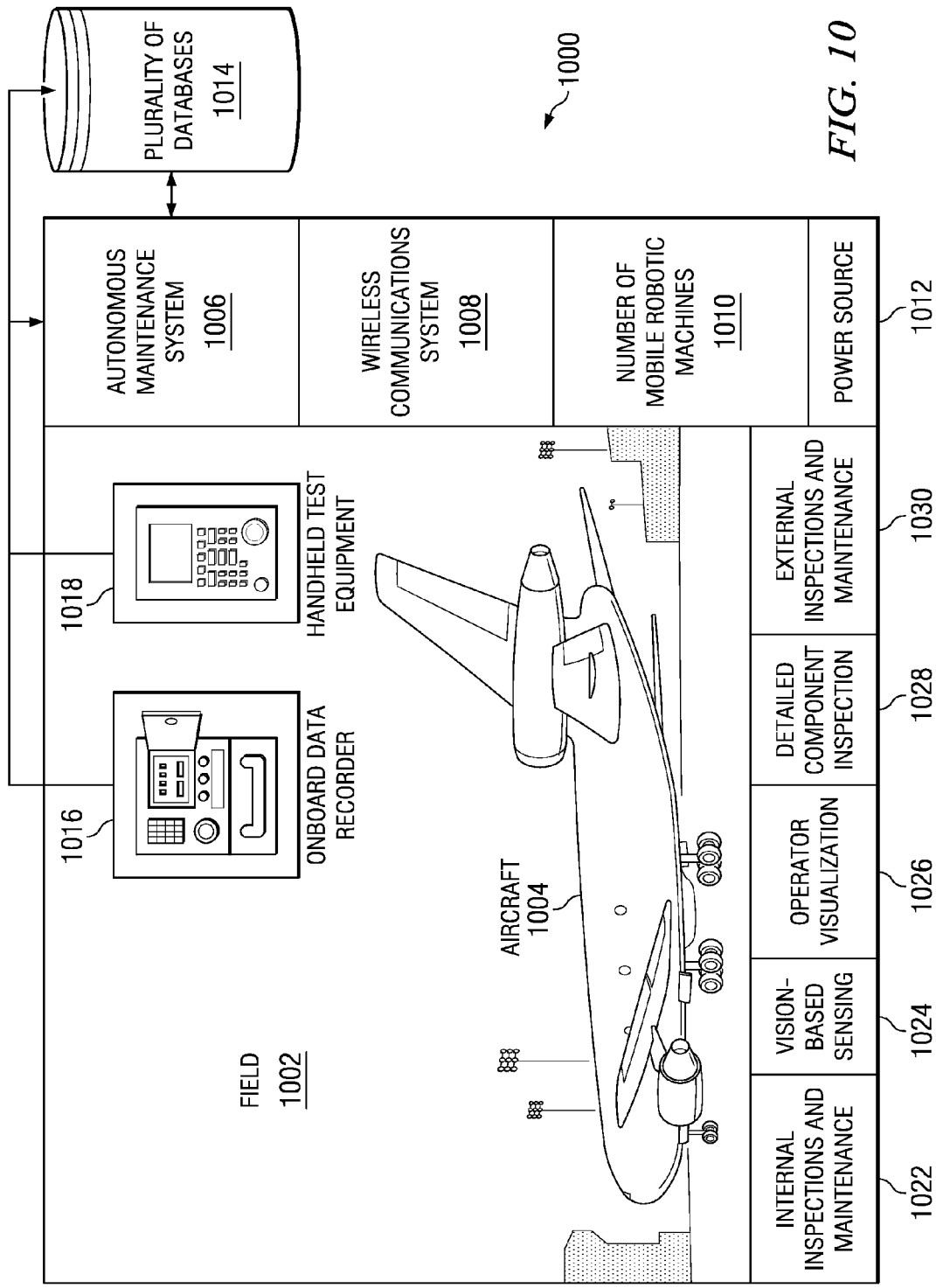
FIG. 10 is an illustration of a maintenance environment in accordance with an advantageous embodiment.

With reference now to FIG. 10, an illustration of a maintenance environment is depicted in accordance with an advantageous embodiment. Maintenance environment 1000 may be an example of one implementation of maintenance environment 300 in FIG. 3.

Maintenance environment 1000 may include field repair 1002. Field repair 1002 may be an example of one implementation of maintenance area 316 in FIG. 3. Field repair 1002 may be, for example, without limitation, a gate, taxiway, runway, or other suitable surface outside a hanger for inspection and maintenance of an aircraft. Aircraft 1004 may be an example of one implementation of structure 302 in FIG. 3. Aircraft 1004 may be moved to field repair 1002 for maintenance and inspection by autonomous maintenance system 1006. Autonomous maintenance system 906 may be an example of one implementation of maintenance and inspection system 308 in FIG. 3.

Wireless communications system 1008 may be an example of one implementation of wireless communications system 320 in FIG. 3. Number of mobile robotic machines 1010 may be an example of one implementation of number of mobile robotic machines 322 in FIG. 3. Power sources 1012 may be an example of one implementation of number of power sources 326 in FIG. 3. Plurality of databases 1014 may be an example of one implementation of plurality of databases 345 in FIG. 3. Plurality of databases 1014 may receive data from onboard data recorder 1016. Handheld test equipment 1018 may be an example of one implementation of off-board data recorder 324 in FIG. 3.

Autonomous maintenance system 1006 may send commands over wireless communications system 1008 to number of mobile robotic machines 1010 to perform maintenance operations on aircraft 1004 in field repair 902. Number of mobile robotic machines 1010 may perform at least one of internal inspections and maintenance 1020, vision-based sensing 1022, operator visualization 1024, detailed component inspection 1026, external inspection and maintenance 1028, and/or some other suitable inspection and maintenance of aircraft 1004.

Figure 11:
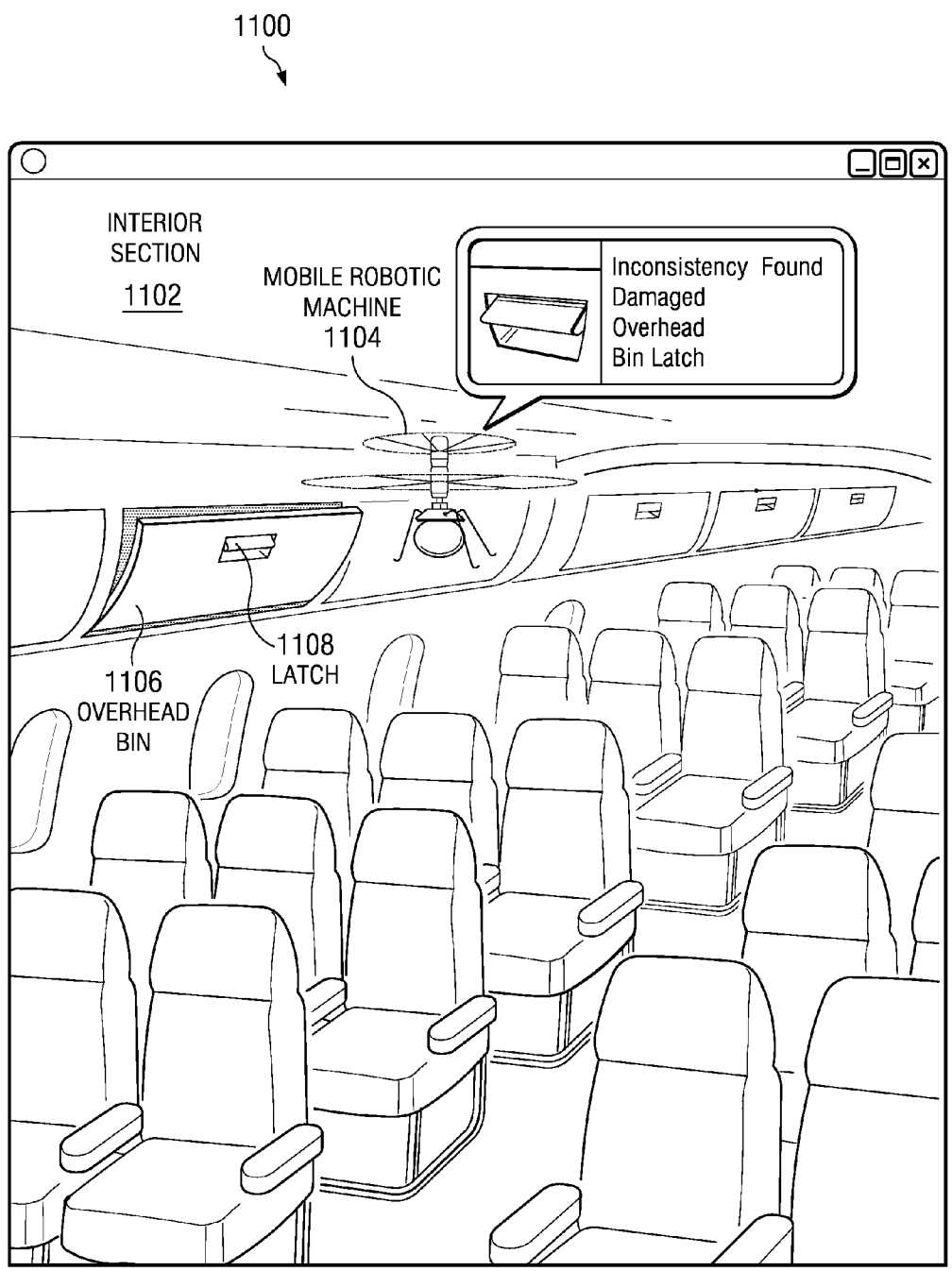
FIG. 11 is an illustration of an inspection process in accordance with an advantageous embodiment.

With reference now to FIG. 11, an illustration of an inspection process is depicted in accordance with an advantageous embodiment. Inspection process 1100 may be an illustrative example of one implementation of the inspection process of structure 400 in FIG. 4.

Interior section 1102 may be an illustrative example of one implementation of interior sections 410 and 412 in FIG. 4. Mobile robotic machine 1104 may be an example of one implementation of number of mobile robotic machines 322 in FIG. 3. Mobile robotic machine 1104 may move throughout interior section 1102 and may detect and identify possible inconsistencies. Mobile robotic machine 1104 may detect an inconsistency on overhead bin 1106, and may identify the inconsistency location as latch 1108. Mobile robotic machine 1104 may transmit the inconsistency information over a wireless communications system to a computer system, such as computer system 318 in FIG. 3. The information may further be stored by the computer system in a database, such as prior inspection data 716 in FIG. 7, for example.

Figure 12:
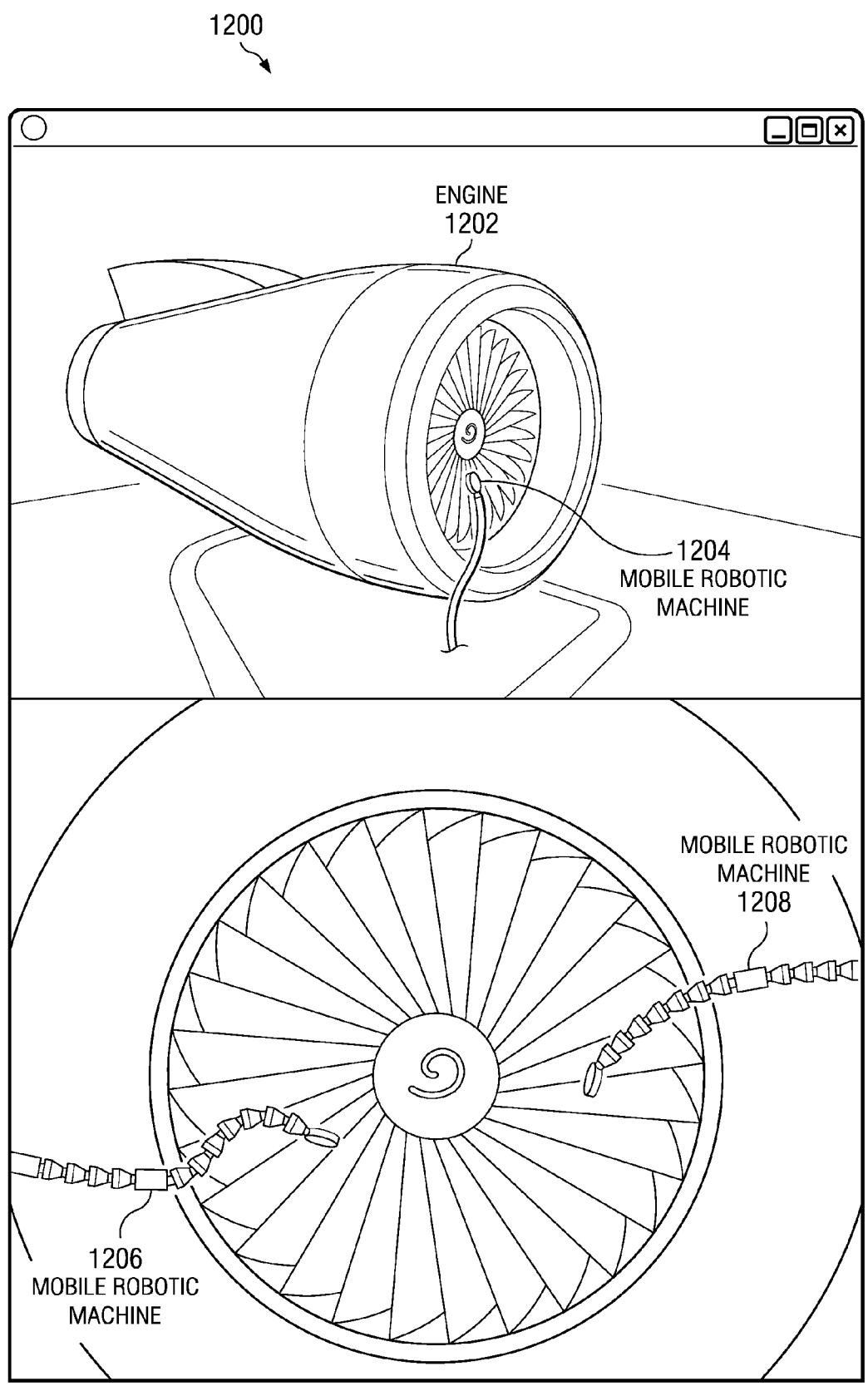
FIG. 12 is an illustration of an inspection area in accordance with an advantageous embodiment.

With reference now to FIG. 12, an illustration of an inspection area is depicted in accordance with an advantageous embodiment. Inspection process 1200 may be an illustrative example of one implementation of the inspection process of structure 400 in FIG. 4.

Engine 1202 may be an illustrative example of one implementation of exterior sections 402 in FIG. 4. Mobile robotic machine 1204 may be an example of one implementation of number of mobile robotic machines 322 in FIG. 3. Mobile robotic machine 1204 may move around engine 1202 and may detect and identify possible inconsistencies. Mobile robotic machine 1204 may perform a macro inspection of engine 1202 and may detect an inconsistency. Mobile robotic machine 1204 may determine that the inconsistency needs micro inspection by an additional number of mobile robotic machines, such as level two machines 362 in FIG. 3. In another advantageous embodiment, mobile robotic machine 1204 may detect an inconsistency on engine 1202, but may be unable to identify or characterize the inconsistency. The information that an inconsistency may have been detected may be transmitted by mobile robotic machine 1204 over a wireless communications system to a computer system, such as computer system 318 in FIG. 3. The computer system may determine that micro inspection may be needed and send commands to level two machines, such as mobile robotic machine 1206 and mobile robotic machine 1208.

Mobile robotic machines 1206 and 1208 may move in and/or throughout engine 1202 and may identify and characterize the possible inconsistency detected. Mobile robotic machines 1206 and 1208 may transmit the inconsistency information over a wireless communications system to a computer system, such as computer system 318 in FIG. 3. The information may further be stored by the computer system in a database, such as prior inspection data 716 in FIG. 7, for example.

Figure 13:
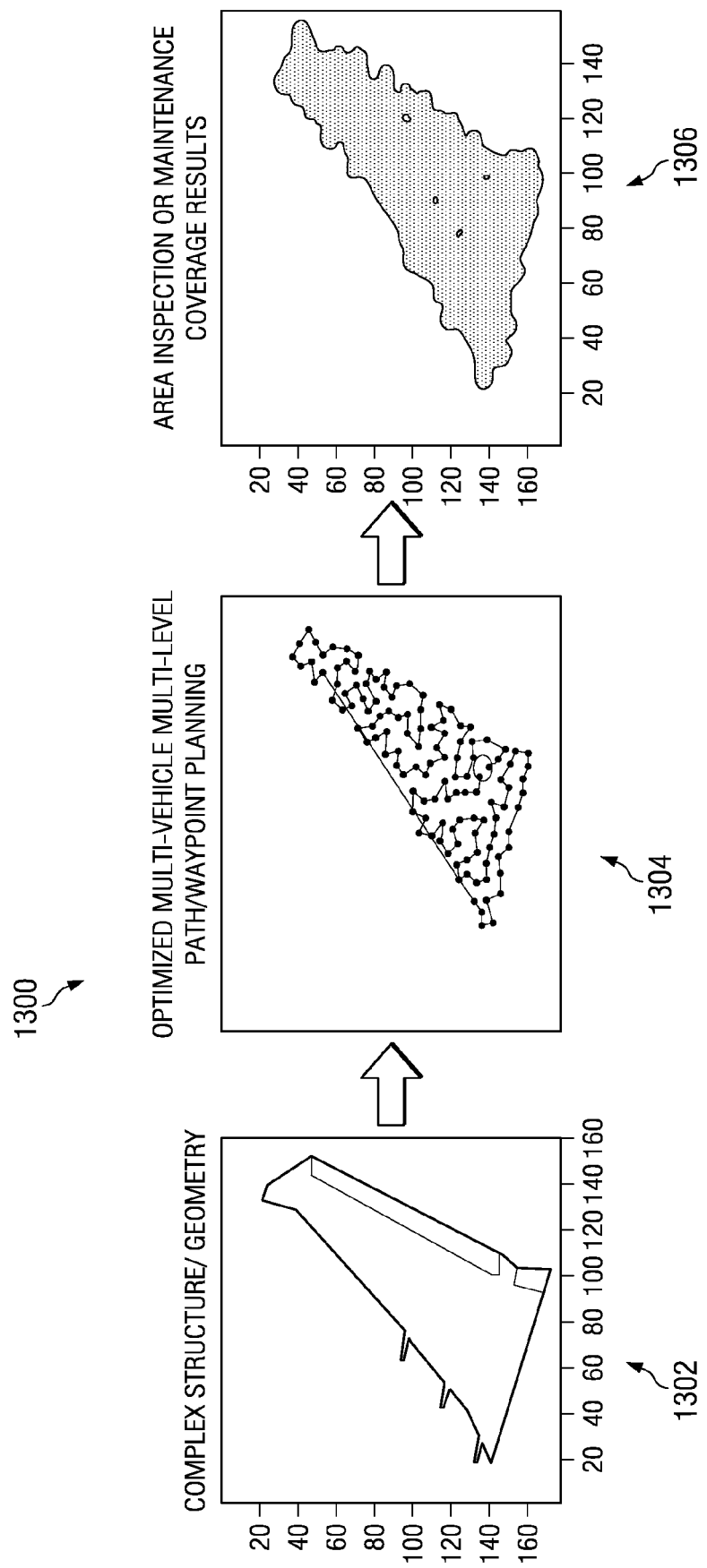
FIG. 13 is an illustration of an inspection process in accordance with an advantageous embodiment.

With reference now to FIG. 13, an illustration of an inspection process is depicted in accordance with an advantageous embodiment. Inspection process 1300 may be an illustrative example of one implementation of the inspection process of structure 400 in FIG. 4.

Complex structure/geometry 1302 may be an illustrative example of one implementation of structure 400 in FIG. 4. In another illustrative example, complex structure/geometry 1302 may be a part of structure 302 in FIG. 3. In order to ensure coverage of the entire structure, optimized multi-vehicle multi-level path/waypoint planning 1304 may be executed by a computer system, such as computer system 318 in FIG. 3. Area inspection or maintenance coverage results 1306 may depict the complete coverage of the structure as a result of optimized multi-vehicle multi-level path/waypoint planning 1304.

Figure 14:
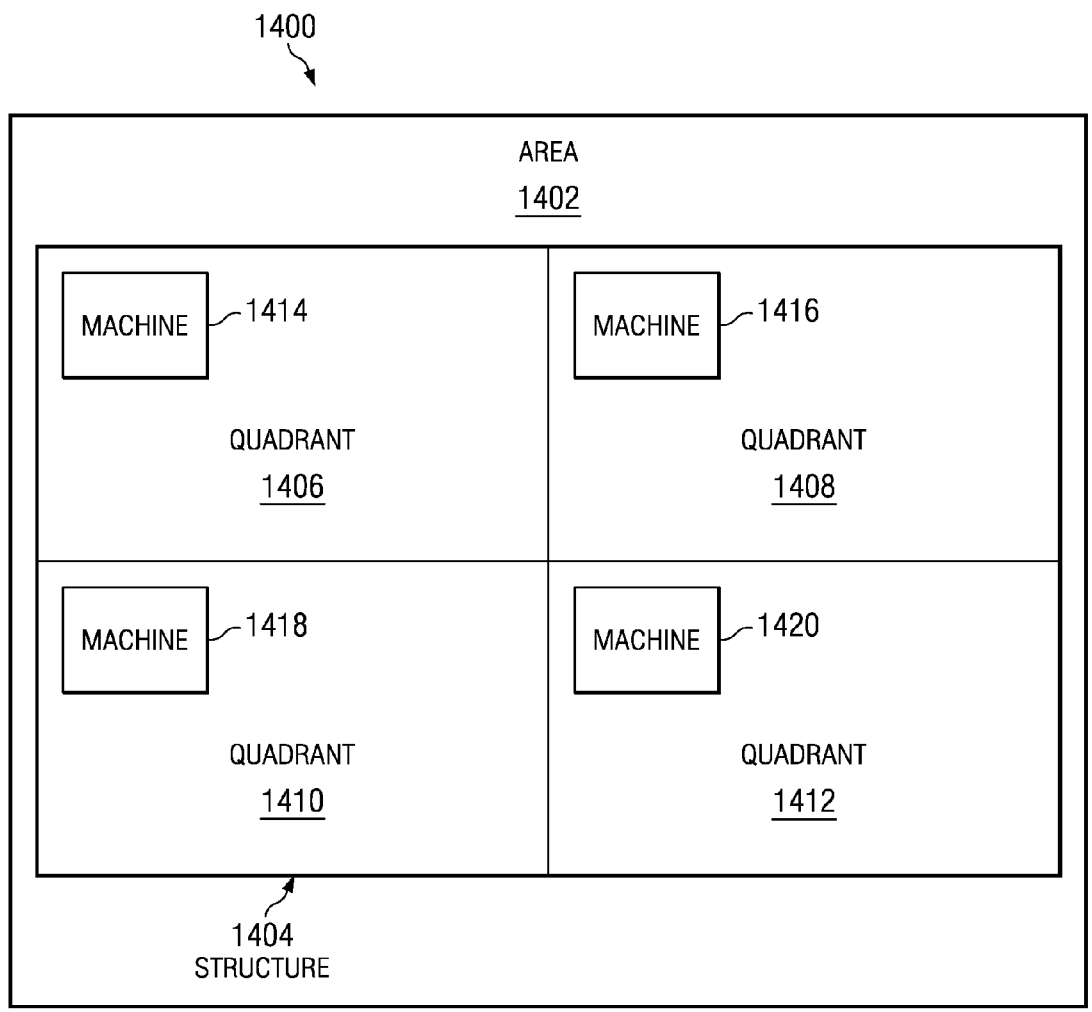
FIG. 14 is an illustration of an inspection process in accordance with an advantageous embodiment.

With reference now to FIG. 14, an illustration of an inspection process is depicted in accordance with an advantageous embodiment. Inspection process 1400 may be an illustrative example of one implementation of the inspection process of structure 400 in FIG. 4.

Area 1402 may contain structure 1404. Area 1402 may be an illustrative example of maintenance area 300 in FIG. 3. Structure 1404 may be an illustrative example of structure 302 in FIG. 3.

Structure 1404 may be analyzed by a computer system, such as computer system 318 in FIG. 3, and may be divided into sections. In one illustrative example, the sections may be quadrant 1406, quadrant 1408, quadrant 1410, and quadrant 1412. Machines 1414, 1416, 1418, and 1420 may be examples of number of mobile robotic machines 322 in FIG. 3. Machine 1414 may be assigned to inspect quadrant 1406. Machine 1416 may be assigned to inspect quadrant 1408. Machine 1418 may be assigned to inspect quadrant 1410. Machine 1420 may be assigned to inspect quadrant 1412. In this example, the entirety of structure 1404 may be inspected by machines 1414, 1416, 1418, and 1420 simultaneously.

Area 1402 may also be inspected collaboratively by machines 1414, 1416, 1418, and 1418 in an ad-hoc manner using an inspection process assigned by a machine controller, such as machine controller 622 in FIG. 6. The machine controller may select an inspection process from a database, such as inspection process database 720 in FIG. 7.

Figure 15:
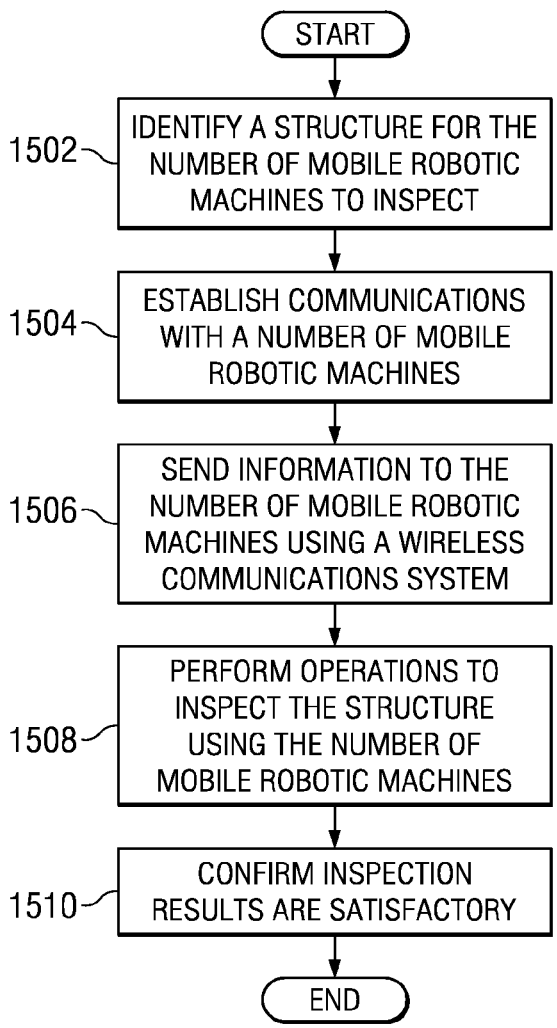
FIG. 15 is an illustration of a flowchart of a process for inspecting a structure in accordance with an advantageous embodiment.

With reference now to FIG. 15, an illustration of a flowchart of a process for inspecting a structure is depicted in accordance with an advantageous embodiment. The process in FIG. 15 may be implemented by a computer system, such as computer system 318 in FIG. 3. In particular, the process illustrated in FIG. 15 may be implemented in machine controller process 350 in FIG. 3.

The process begins by identifying a particular structure for the number of mobile robotic machines to inspect (operation 1502). The process then establishes communications with a number of mobile robotic machines (operation 1504). Communications may be established using a wireless communications system, such as wireless communications system 320 in FIG. 3, for example. The process sends information to the number of mobile robotic machines using the wireless communications system (operation 1506). The information sent to the number of mobile robotic machines may be in the form of commands and programs, such as commands 342 and programs 348 in FIG. 3, for example. The process then performs operations to inspect the structure using the number of mobile robotic machines (operation 1508). The process confirms inspection results are satisfactory (operation 1510), with the process terminating thereafter.

Inspection results may be confirmed by messages received from the number of mobile robotic machines, such as messages 346 in FIG. 3, for example. An autonomous inspection system, such as maintenance and inspection system 308 in FIG. 3, may confirm that results are satisfactory using messages received from mobile robotic machines and/or comparing messages received about inspection results with stored maintenance information, such as object reliability and maintainability database 706, engineering and material management database 708, and/or any other suitable source of information stored in plurality of databases 700 in FIG. 7.

Figure 16:
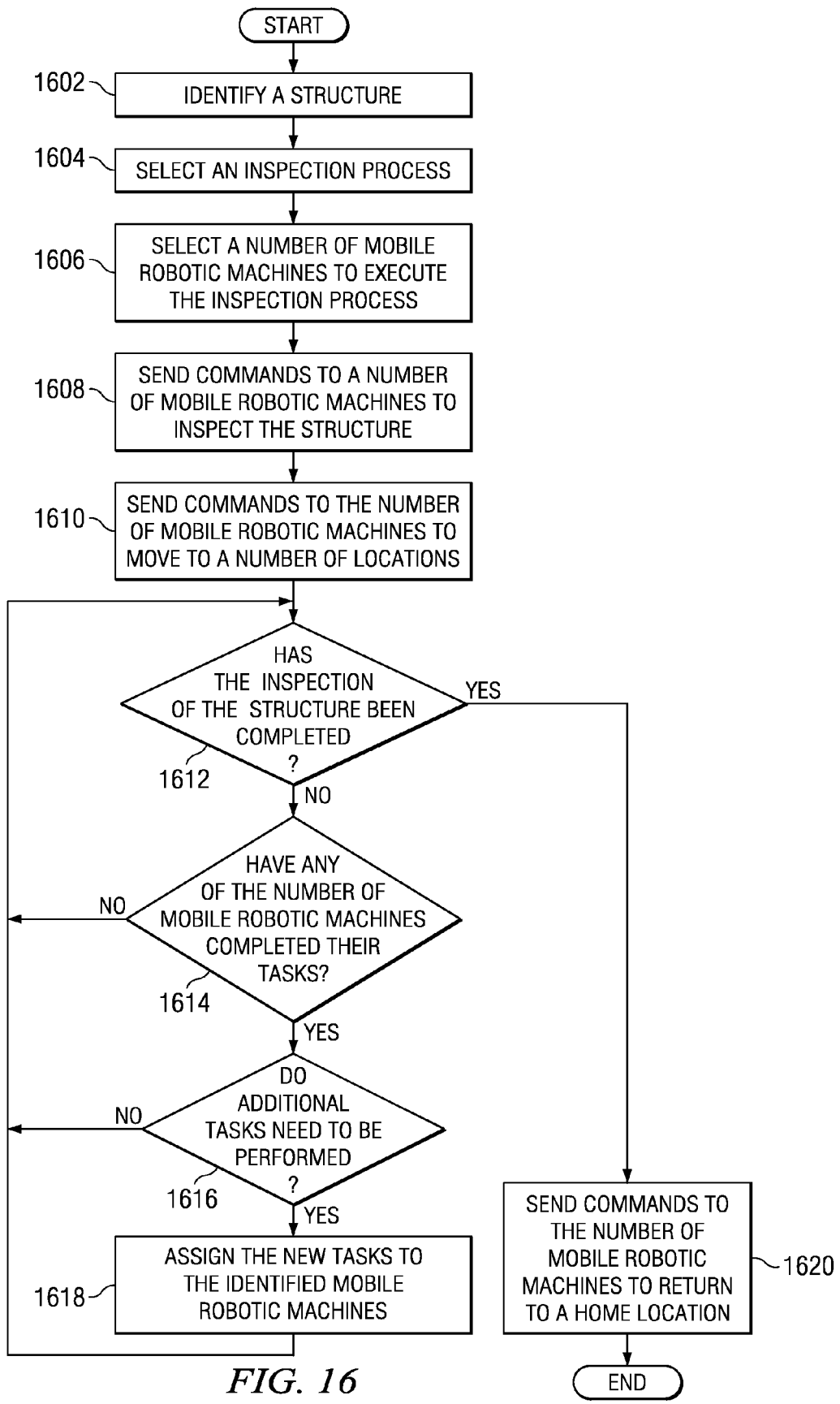
FIG. 16 is an illustration of a flowchart of a process for inspecting a structure in accordance with an advantageous embodiment.

With reference now to FIG. 16, an illustration of a flowchart of a process for inspecting a structure is depicted in accordance with an advantageous embodiment. The process in FIG. 16 may be implemented by a computer system, such as computer system 318 in FIG. 3. In particular, the process illustrated in FIG. 15 may be implemented in machine controller process 350 in FIG. 3.

The process begins by identifying a structure (operation 1602). The process selects an inspection process (operation 1604). The inspection process may be selected from a number of inspection processes in a database, such as inspection process database 720 in FIG. 7. As used herein, a number refers to one or more inspection processes.

Next, the process selects a number of mobile robotic machines to execute the inspection process (operation 1606). The number of mobile robotic machines may be selected based on a number and type of mobile robotic machine determined by a machine controller for effectively performing the desired inspection type. For example, the machine controller may determine that two level one machines for macro inspection and two level two machines for micro inspection are the number best suited to perform a particular type of inspection within the time allocated to complete the inspection. The process sends commands to the number of mobile robotic machines to inspect the structure (operation 1608). These commands may be sent over a wireless communication system, such as wireless communication system 320 in FIG. 3, in the form of commands 342, for example. The process then sends commands to the number of mobile robotic machines to move to a number of locations (operation 1610). The number of locations may be, for example, a number of sections of the structure. The number of locations may be, in another example, a number of areas of a maintenance area, such as maintenance area 316 in FIG. 3, for example.

Next, the process determines whether the inspection of the structure is complete (operation 1612). This determination may be aided by the receipt of messages from the number of mobile robotic machines, such as messages 346 in FIG. 3, for example. If the inspection of the structure is not complete, the process determines whether any of the number of mobile robotic machines have completed their tasks (operation 1614). If none of the number of mobile robotic machines have completed their task, the process returns to operation 1612. If any of the number of mobile robotic machines have completed their task, the process then determines whether additional tasks need to be performed (operation 1616). If no additional tasks need to be performed, the process returns to operation 1612. If additional tasks do need to be performed, the process assigns the new tasks to the identified mobile robotic machines that have completed their previous tasks (operation 1618), and then returns to operation 1612. Additional tasks may be assigned by sending new programs or new commands to the identified mobile robotic machines, such as programs 348 and/or commands 342 in FIG. 3, for example.

When the process determines that the inspection of the structure has been completed in operation 1612, the process then sends commands to the number of mobile robotic machines to return to a home location (operation 1620), with the process terminating thereafter.

Figure 17:
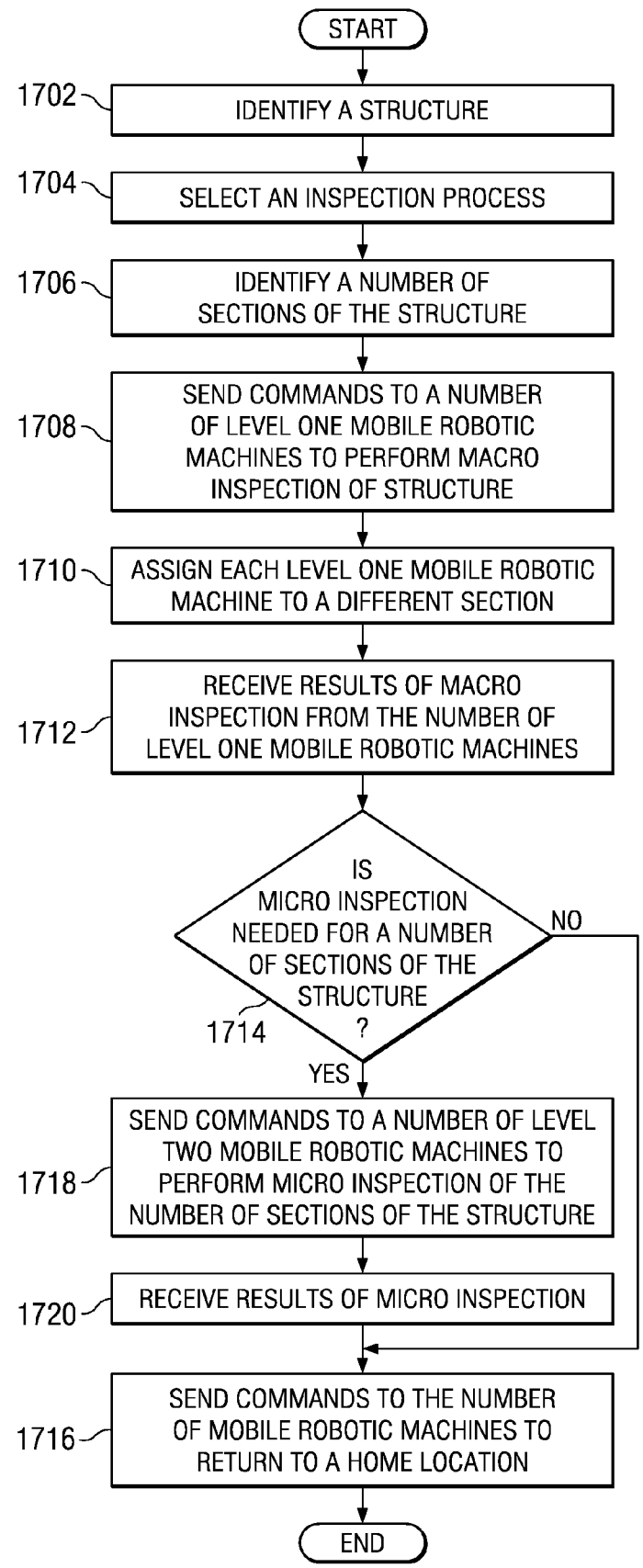
FIG. 17 is an illustration of a flowchart of a process for inspecting a structure in accordance with an advantageous embodiment.

With reference now to FIG. 17, an illustration of a flowchart of a process for inspecting a structure is depicted in accordance with an advantageous embodiment. The process in FIG. 17 may be implemented by a computer system, such as computer system 318 in FIG. 3. In particular, the process illustrated in FIG. 15 may be implemented in machine controller process 350 in FIG. 3.

The process begins by identifying a structure (operation 1702). The process then selects an inspection process (operation 1704). The inspection process may be selected from a number of inspection processes in a database, such as inspection process database 720 in FIG. 7. As used herein, a number refers to one or more inspection processes.

The process identifies a number of sections of the structure (operation 1706). For example, in one advantageous embodiment, the number of sections of the structure may include exterior sections, such as exterior sections 402, 404, 406 and 408 in FIG. 4, and interior sections, such as interior sections 410 and 412 in FIG. 4. The process then sends commands to a number of level one mobile robotic machines to perform macro inspection of the structure (operation 1708). The commands, such as commands 342 in FIG. 3, may be sent over a wireless communications system, such as wireless communications system 320 in FIG. 3. The process assigns each level one mobile robotic machine to a different section identified for the structure (operation 1710).

For example, in one advantageous embodiment, the number of level one mobile robotic machines may be implemented as mobile robotic machines 414, 416, 418, and 420 in FIG. 4. In this illustrative example, each level one mobile robotic machine is assigned to a different exterior section of structure 400 in FIG. 4 in order to perform a macro inspection of structure 400. In another advantageous embodiment, the number of level one mobile robotic machines may be implemented as machines 1414, 1416, 1418, and 1420 in FIG. 14. In this illustrative example, each level one mobile robotic machine is assigned to a different quadrant of area 1402 in FIG. 14. In yet other advantageous embodiments, the number of level one mobile robotic machines may perform macro inspection of a structure using a process such as, without limitation, vertex ant walk processes, mark and cover processes, trajectory construction using Lin-Kernighan (LK) processes, boustrophedon cellular decomposition processes, and/or other suitable processes for covering inspection of an area and/or surface.

Next, the process receives results of the macro inspection from the number of level one mobile robotic machines (operation 1712). The results may be received in the form of messages form the level one mobile robotic machines, such as messages 346 in FIG. 3, for example. The process then determines whether micro inspection may be needed for a number of sections of the structure (operation 1714). As used herein, a number refers to one or more sections. Micro inspection may be needed if a possible inconsistency is detected during macro inspection, for example, and further identification and characterization of the possible inconsistency is needed to determine whether a maintenance inconsistency exists. If the process determines that micro inspection may be not needed, the process sends commands to the number of mobile robotic machines to return to a home location (operation 1716), with the process terminating thereafter.

If the process determines that micro inspection may be needed, the process then sends commands to a number of level two mobile robotic machines to perform micro inspection of the number of sections identified by the number of level one mobile robotic machines (operation 1718). The process receives results of micro inspection (operation 1720) and returns to operation 1716, with the process terminating thereafter.

Figure 18:
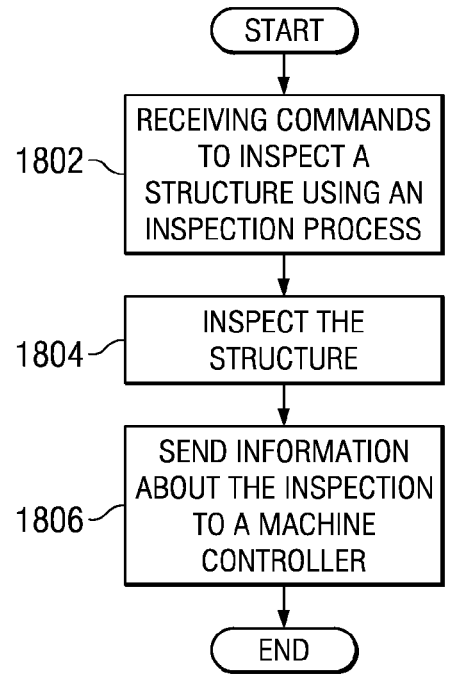
FIG. 18 is an illustration of a flowchart of a process for inspecting a structure in accordance with an advantageous embodiment.

With reference now to FIG. 18, an illustration of a flowchart of a process for inspecting a structure is depicted in accordance with an advantageous embodiment. The process in FIG. 18 may be implemented by a mobile robotic machine, such as mobile robotic machine 600 in FIG. 6.

The process begins by receiving commands from a machine controller to inspect a structure using an inspection process (operation 1802). In one illustrative example, commands may be received over a wireless communications system, such as wireless communications system 320 in FIG. 3. The process inspects the structure using the inspection process (operation 1804). The process then sends information about the inspection to a machine controller (operation 1806), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments take into account and recognize that currently used maintenance systems do not provide continuous and/or periodic data needed to detect and monitor component conditions. The different advantageous embodiments also recognize that existing maintenance methods rely on disassembly to inspect hidden areas.

The different advantageous embodiments take into account and recognize that currently used inspection and maintenance techniques require extensive periods of time to accomplish and require access to hazardous locations. The different advantageous embodiments also recognize and take into account that a different inspection and maintenance system may be required for different types of aircraft structures. For example, the different advantageous embodiments recognize and take into account that an aircraft inspection and maintenance system designed for inspecting aircraft wings may not be suitable for use in inspecting aircraft fuselages.

Thus, one or more of the different advantageous embodiments may provide an apparatus that may comprise a number of mobile robotic machines, a wireless communications system and a computer system. The number of mobile robotic machines may be capable of moving to a number of locations in a maintenance area and may be capable of performing a number of maintenance operations on a structure in the maintenance area. The wireless communications system may be capable of providing communication with the number of mobile robotic machines within the maintenance area. The computer system may be capable of exchanging information with the number of mobile robotic machines using the wireless communications system.

The different advantageous embodiments may provide a wireless communications system that may be capable of providing communications with the number of mobile robotic machines within the maintenance area. The computer system may be capable of generating commands and programs for the number of mobile robotic machines in the maintenance area and communicating the commands and programs to the number of mobile robotic machines to perform a number of maintenance operations for a structure.

The different advantageous embodiments may further provide an autonomous system of systems that may accomplish maintenance over the life of an object, such as an aircraft for example. Sensors and maintenance devices may be embedded within an object, incorporated into mobile air and ground robotic units, and/or incorporated into floor mounted robotic units. The different advantageous embodiments may provide for continuous, autonomous maintenance of objects. The different advantageous embodiments may provide for a system that incorporates both mobile and fixed robotic units to provide for continuous, autonomous maintenance of objects. The different advantageous embodiments may minimize the cost of maintaining regulatory standards and preventative maintenance, and improve the efficiency of inspection and maintenance actions by providing an autonomous system for directing the decision, control, and task scheduling for maintenance operations.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a plurality of mobile robotic machines configured to move to a plurality of locations in a maintenance area and configured to perform a plurality of maintenance operations on a structure in the maintenance area, wherein the plurality of mobile robotic machines are arranged to perform at least one maintenance operation on a structure in the maintenance area, including at least one of simultaneous and tiered inspection operations, to cover inspection of both of respective exterior and interior sections of the structure, and wherein a first portion of the plurality of mobile robotic machines are arranged on exterior sections of the structure and the second portion of the plurality of mobile robotic machines are arranged on interior sections of the structure, wherein the plurality of mobile robotic machines comprises at least one of an internal mobile robotic machine in a number of internal mobile robotic machines and an external mobile robotic machine in a number of external mobile robotic machines, wherein the number of external mobile robotic machines further comprise at least one of a level one machine in a number of level one machines and a level two machine in a number of level two machines, wherein the number of level one machines are configured to perform macro inspection of the structure, and wherein the number of level two machines are configured to perform micro inspection of the structure in order to identify or characterize a detected inconsistency;
a wireless communications system configured to provide communication with the plurality of mobile robotic machines within the maintenance area; and
a computer system configured to exchange information with the plurality of mobile robotic machines using the wireless communications system.

2. The apparatus of claim 1, further comprising:
a plurality of power sources configured to supply power to the plurality of mobile robotic machines.

3. The apparatus of claim 1, wherein the information comprises at least one of a message, a program, and a command.

4. The apparatus of claim 3, wherein the message comprises at least one of sensor data, operation status, and operation queries.

5. The apparatus of claim 3, wherein the computer system is further configured to generate commands and programs for execution by the plurality of mobile robotic machines, communicating the commands and the programs to the plurality of mobile robotic machines, and receiving messages from the plurality of mobile robotic machines.

6. The apparatus of claim 3, wherein the plurality of mobile robotic machines is further configured to generate a plurality of messages and transmitting the plurality of messages to the computer system.

7. The apparatus of claim 1, wherein the plurality of mobile robotic machines further comprises:
a sensor system, wherein the sensor system comprises a number of sensors.

8. The apparatus of claim 7, wherein the number of sensors comprises a number of types of sensors selected from at least one of a camera, a receiver configured to receive positioning system information, a non-destructive evaluation scanner, a microelectromechanical system device, a magnetic field sensor, an ultraviolet light source, an ultraviolet light receptor, a temperature sensor, a pressure sensor, a humidity sensor, a radio frequency identification reader, and fiber optics.

9. The apparatus of claim 7, wherein the number of sensors are located on at least one of the plurality of mobile robotic machines.

10. The apparatus of claim 1, wherein the number of external mobile robotic machines are configured to move around an exterior of the structure and configured to perform a number of first operations on the exterior of the structure.

11. The apparatus of claim 10, wherein the number of internal mobile robotic machines are configured to move within an interior of a structure and configured to perform a number of second operations in the interior of the structure, wherein the number of second operations are performed in conjunction with the number of first operations to inspect the structure.

12. The apparatus of claim 10, wherein the number of internal mobile robotic machines are configured to be permanently located in an interior of the structure and configured to perform a number of third operations in the interior of the structure.

13. The apparatus of claim 1, wherein the number of maintenance operations comprises at least one of inspecting the structure, scanning the structure, capturing an image, detecting inconsistency, identifying inconsistency, characterizing inconsistency, cleaning the structure, repairing the structure, and moving the structure.

14. The apparatus of claim 1, wherein the structure is selected from one of an aircraft, a wing, a fuselage, an engine, a tank, a submarine, a spacecraft, a surface ship, a building, a manufacturing floor, and a vehicle.

15. The apparatus of claim 1, wherein the at least one maintenance operation includes at least one of simultaneous and tiered inspection operations.

16. A maintenance and inspection system comprising:
a number of external mobile robotic machines disposed on an exterior of a structure and configured to move around the exterior, and configured to perform a number of first operations on the exterior of the structure, including at least one of simultaneous and tiered inspection operations; and
a number of internal mobile robotic machines disposed on an interior of the structure and configured to move within the interior, and configured to perform a number of second operations in the interior of the structure, including at least one of simultaneous and tiered inspection operations; and
wherein the number of external mobile robotic machines further comprise at least one of a level one machine in a number of level one machines and a level two machine in a number of level two machines, wherein the number of level one machines are configured to perform macro inspection of the structure, and wherein the number of level two machines are configured to perform micro inspection of the structure in order to identify or characterize a detected inconsistency.

17. A maintenance and inspection system for a structure comprising:
a plurality of mobile robotic machines configured to move to a plurality of locations in a maintenance area and configured to perform a plurality of maintenance operations to inspect the structure in the maintenance area, wherein the operations comprises at least one of inspecting the structure, scanning the structure, capturing an image, detecting inconsistency, identifying inconsistency, characterizing inconsistency, cleaning the structure, repairing the structure, and moving the structure, wherein the plurality of mobile robotic machines comprises a number of internal mobile robotic machines disposed on an interior of a structure and a number of external mobile robotic machines disposed on an exterior of the structure, wherein the number of external mobile robotic machines further comprise at least one level one machine in a number of level one machines and at least one level two machine in a number of level two machines, wherein the number of level one machines are configured to perform a macro inspection of the structure, wherein the number of level two machines are configured to perform a micro inspection of the structure, wherein the number of external mobile robotic machines are configured to move around an exterior of the structure and configured to perform a number of first operations on the exterior of the structure in order to identify or characterize a first detected inconsistency, wherein the number of internal mobile robotic machines are configured to move within an interior of the structure and configured to perform a number of second operations in the interior of the structure in order to identify or characterize a second detected inconsistency, wherein the number of second operations are performed in conjunction with the number of first operations to inspect the structure;
a wireless communications system configured to provide communication with the plurality of mobile robotic machines within the maintenance area;
a computer system configured to exchange information with the plurality of mobile robotic machines, wherein the information comprises at least one of a message, a program, and a command, wherein the message comprises at least one of sensor data, operation status, and operation queries received from the plurality of mobile robotic machines;
a plurality of power sources configured to supply power to the plurality of mobile robotic machines; and
a sensor system, wherein the sensor system comprises a number of sensors, wherein the number of sensors are located on at least one of the plurality of mobile robotic machines, wherein the number of sensors comprises a number of types of sensors selected from at least one of a camera, a receiver configured to receive positioning system information, a non-destructive evaluation scanner, a microelectromechanical system device, a magnetic field sensor, an ultraviolet light source, an ultraviolet light receptor, a temperature sensor, a pressure sensor, a humidity sensor, a radio frequency identification reader, and fiber optics.

18. A method for inspecting a structure, the method comprising:
   identifying the structure;
   establishing communications with a plurality of mobile robotic machines configured to move to a plurality of locations in a maintenance area and configured to perform a plurality of operations to inspect the structure in the maintenance area, including at least one of simultaneous and tiered inspection operations, using a wireless communications system, wherein the plurality of mobile robotic machines are arranged to perform at least one maintenance operation on a structure in the maintenance area to cover inspection of respective exterior and interior sections of the structure;
   selecting an inspection process;
   selecting a plurality of mobile robotic machines to execute the inspection process;
   sending commands to the plurality of mobile robotic machines to inspect the structure using the inspection process via an autonomous maintenance system;
   inspecting an exterior section of the structure using a first portion of the plurality of mobile robots;
   concurrently with inspecting the exterior section, inspecting an interior section of the structure using a second portion of the plurality of mobile robots; and
   wherein the first portion further comprises at least one of a level one machine in a number of level one machines and a level two machine in a number of level two machines, wherein the number of level one machines are configured to perform macro inspection of the structure, and wherein the number of level two machines are configured to perform micro inspection of the structure in order to identify or characterize a detected inconsistency.

19. The method of claim 18, wherein sending commands to the plurality of mobile robotic machines to inspect the structure using the inspection process further comprises:
   identifying a plurality of sections of the structure for inspection, wherein the plurality of sections collectively comprise the structure;
   sending commands to the plurality of mobile robotic machines, wherein the commands comprise the plurality of sections to be inspected and assign a section in the plurality of sections to at least one mobile robotic machine in the plurality of mobile robotic machines; and
   receiving first messages from the plurality of mobile robotic machines, wherein the first messages comprise data from the inspection of the structure.

20. The method of claim 19, wherein the second portion further comprises at least one of a second level one machine in a second number of level one machines and a second level two machine in a second number of level two machines, wherein the second number of level one machines are configured to perform macro inspection of the structure, and wherein the second number of level two machines are configured to perform micro inspection of the structure in order to identify or characterize a detected inconsistency.

21. A method comprising:
   commanding, via an autonomous maintenance system, a number of mobile robotic machines to perform an inspection of a structure, wherein the number of mobile robotic machines comprise at least one of a number of external mobile robotic machines and a number of internal mobile robotic machines, wherein the number of external mobile robotic machines comprise at least one of a level one machine in a number of level one machines and a level two machine in a number of level two machines, wherein the at least one of the number of level one machines are configured to perform a macro inspection of the structure and the at least one of the number of level two machines are configured to perform a micro inspection of the structure, wherein the number of external mobile robotic machines are configured to perform a number of first operations on the exterior of the structure, including at least one of simultaneous and tiered inspection operations to identify or characterize a first detected inconsistency, and wherein the number of internal mobile robotic machines are configured to perform a number of second operations in the interior of the structure, including at least one of simultaneous and tiered inspection operations, to identify or characterize a second detected inconsistency; and
   performing, using the number of mobile robotic machines, an inspection of the structure.

22. The method of claim 21 wherein the number of internal mobile robotic machines further comprise at least one of a second level one machine in a number of second level one machines and a second level two machine in a number of second level two machines, and wherein commanding the number of mobile robotic machines to perform a second number of operations in the interior of the structure further includes:
   commanding the at least one of the second number of level one machines to perform a second macro inspection of the structure; and
   commanding the at least one of the second number of level two machines to perform a second micro inspection of the structure.

* * * * *

UNITED STATES PATENT AND TRADEMARK OFFICE
CERTIFICATE OF CORRECTION

Page 1 of 1

PATENT NO. : 8,812,154 B2
APPLICATION NO. : 12/404493
DATED : August 19, 2014
INVENTOR(S) : John Lyle Vian et al.

It is certified that error appears in the above-identified patent and that said Letters Patent is hereby corrected as shown below:

In the Specification

At column 4, line 58, the word "hanger" should be changed to --hangar--.

At column 17, line 5, both instances of the word "hanger" should be changed to --hangar--.

At column 17, line 9, the word "hanger" should be changed to --hangar--.

At column 17, line 28, the word "hanger" should be changed to --hangar--.

At column 17, line 44, the word "hanger" should be changed to --hangar--.

Signed and Sealed this
Twenty-fifth Day of November, 2014

Michelle K. Lee
*Deputy Director of the United States Patent and Trademark Office*